(12) United States Patent
Yamamoto

(10) Patent No.: US 9,638,347 B2
(45) Date of Patent: May 2, 2017

(54) DEVICE FOR BLOCKING A FLOW PASSAGE USING AN INFLATABLE BAG

(71) Applicant: Waterworks Technology Development Organization Co., Ltd., Osaka-shi (JP)

(72) Inventor: Daisuke Yamamoto, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 34 days.

(21) Appl. No.: 14/644,729

(22) Filed: Mar. 11, 2015

(65) Prior Publication Data

US 2016/0265680 A1    Sep. 15, 2016

(51) Int. Cl.
| | | |
|---|---|---|
| *F16K 31/126* | (2006.01) | |
| *F16K 7/10* | (2006.01) | |
| *F16L 55/124* | (2006.01) | |
| *F16L 55/134* | (2006.01) | |

(52) U.S. Cl.
CPC .............. *F16K 31/126* (2013.01); *F16K 7/10* (2013.01); *F16L 55/124* (2013.01); *F16L 55/134* (2013.01)

(58) Field of Classification Search
CPC ...... F16K 31/126; F16L 55/124; F16L 55/134
See application file for complete search history.

(56) References Cited

U.S. PATENT DOCUMENTS

| | | | |
|---|---|---|---|
| 1,388,890 A * | 8/1921 | Provich ................. | F16L 55/124 138/94 |
| 1,860,855 A | 5/1932 | Gardner | |
| 1,906,151 A * | 4/1933 | Goodman ................. | F16K 7/10 138/93 |
| 3,842,864 A * | 10/1974 | Riegel ....................... | F16K 7/10 138/93 |
| 4,291,727 A * | 9/1981 | Yie .......................... | F16K 7/10 137/318 |
| 4,509,343 A | 4/1985 | Brister | |
| 5,285,806 A * | 2/1994 | Ortega .................. | F16L 55/124 137/15.08 |
| 5,624,206 A | 4/1997 | Cohen et al. | |
| 7,000,641 B2 * | 2/2006 | Welfare ..................... | F16K 7/10 137/488 |

(Continued)

FOREIGN PATENT DOCUMENTS

| | | |
|---|---|---|
| DE | 649534 C | 8/1937 |
| EP | 0989344 A1 | 3/2000 |

(Continued)

*Primary Examiner* — Craig Schneider
*Assistant Examiner* — Kevin Barss
(74) *Attorney, Agent, or Firm* — The Webb Law Firm

(57) ABSTRACT

An insertion guide tube that is inserted into a sealing case and that houses a blockage bag in a reduced-size state can be moved inside the sealing case and inside a branch pipe portion along an axis of the branch pipe portion until the insertion guide tube is brought into an abutting position in which at least a part of a leading end portion of the insertion guide tube abuts against an outer surface-side peripheral edge portion of a branch port on an outer circumferential surface of a fluid pipe. In a state in which the blockage bag is located at a predetermined internal flow passage blocking position, an axis adjustment portion that can make sliding contact with an inner surface of the insertion guide tube is located in a portion corresponding to branch port in a radial direction of the fluid pipe.

15 Claims, 14 Drawing Sheets

(56) References Cited

U.S. PATENT DOCUMENTS

2005/0229985 A1* 10/2005 Saxenfelt .............. A63B 41/02
                                                    138/93
2013/0048130 A1   2/2013 Lundman
2014/0366976 A1  12/2014 Al Shammary

FOREIGN PATENT DOCUMENTS

| JP | 6047221 | 4/1975 |
|---|---|---|
| JP | 6128958 | 8/1986 |
| JP | 03213797 A | 9/1991 |
| JP | 2760674 B2 | 2/1993 |
| JP | 875077 A | 3/1996 |
| JP | 4521956 B2 | 4/2002 |
| JP | 2013130244 A | 7/2013 |

* cited by examiner

DEVICE FOR BLOCKING A FLOW PASSAGE USING AN INFLATABLE BAG

TECHNICAL FIELD

This disclosure relates to a device for blocking a flow passage without interrupting flow, the device including a blockage bag that is to be inserted into a fluid pipe via a branch port formed in the fluid pipe and that is to be deformed and expanded so as to increase in diameter to close an internal flow passage of the fluid pipe.

RELATED ART

As an example of this type of device for blocking a flow passage without interrupting flow, JP H8-75077A discloses a flow passage blocking device including a blockage bag that is to be inserted into an internal flow passage of a fluid pipe via a branch pipe portion communicating with a hole (an example of the branch port) formed in the fluid pipe and via that hole. This device is configured such that after the blockage bag is inserted into the internal flow passage, the blockage bag can be deformed and expanded so as to increase in diameter by a diameter-increasing fluid being supplied into the blockage bag, and thus close the internal flow passage.

SUMMARY

With the device for blocking a flow passage without interrupting flow disclosed in JP H8-75077A, the blockage bag is inserted into the internal flow passage of the fluid pipe via the branch pipe portion and the hole, and therefore, during the insertion, the blockage bag is likely to come into contact with or be caught on a burr that is left on an inner surface of the hole during formation of the hole or a projection etc. that is present on an inner surface of the branch pipe portion. Consequently, the blockage bag may be scratched or damaged, and the insertion of the blockage bag into the internal flow passage via the branch pipe portion and the hole may be difficult in itself.

Moreover, in an uninterrupted flow state in which flow of a fluid through the internal flow passage of the fluid pipe is maintained, the fluid pressure from the fluid acts on the blockage bag. Therefore, during the insertion of the blockage bag into the internal flow passage of the fluid pipe via the branch pipe portion and the hole, the blockage bag is more likely to, for example, come into contact with a burr on the inner surface of the hole or a projection etc. on the inner surface of the branch pipe portion, and the insertion into the internal flow passage may be more difficult.

In particular, in such an uninterrupted flow state, the blockage bag inserted into the internal flow passage via the hole is pressed by the fluid pressure from the fluid flowing through the internal flow passage so as to move downstream of the hole (farther downstream in the fluid pipe than the axis of the branch pipe portion). Accordingly, the position at which the blockage bag closes the internal flow passage may be shifted from a desired blocking position. Moreover, the blockage bag closing the internal flow passage at the desired blocking position may be deformed or moved to cause a change in the degree of adhesion to an inner circumferential surface of the internal flow passage and thus can no longer sufficiently exhibit the intended closing effect, and accordingly, the stoppage of the fluid may be insufficient.

To address these issues, it is desired that a device for blocking a flow passage without interrupting flow be provided which, in an uninterrupted flow state in which flow of a fluid through an internal flow passage of a fluid pipe is maintained, facilitates insertion of and prevents damage to a blockage bag inserted into the internal flow passage and can furthermore reliably close the internal flow passage.

An aspect of this disclosure is a device for blocking a flow passage without interrupting flow, including a blockage bag that is to be inserted into a fluid pipe via a branch port formed in the fluid pipe and that is to be deformed and expanded so as to increase in diameter to close an internal flow passage of the fluid pipe, the device including:

a sealing case that is to be in communication with the branch port and that is to be detachably connected to a branch pipe portion having a valve member;

an insertion guide tube that is inserted into the sealing case;

a shaft that is inserted into the sealing case and the insertion guide tube so as to be slidable along an axis of the branch pipe portion while a sealed state is maintained and that includes a through flow passage inside;

the blockage bag that is fixed to a leading end portion of the shaft, the leading end portion being located inside the insertion guide tube, and that can be deformed and elastically expanded so as to increase in diameter by a diameter-increasing fluid that is supplied via the through flow passage;

a push operation mechanism that pushes and moves the shaft against a fluid pressure inside the fluid pipe; and an axis adjustment portion that is fixed to the leading end portion of the shaft or a base end region of the blockage bag, the leading end portion and the base end region being located inside the insertion guide tube, and that can make sliding contact with an inner surface of the insertion guide tube, wherein the insertion guide tube, with the blockage bag in a reduced-size state being housed in the insertion guide tube, can be moved inside the sealing case and inside the branch pipe portion along the axis of the branch pipe portion by the push operation mechanism, until the insertion guide tube is brought into an abutting position in which at least a part of the leading end portion of the insertion guide tube abuts against an outer surface-side peripheral edge portion of the branch port on an outer circumferential surface of the fluid pipe, and the blockage bag that is housed in the insertion guide tube in the abutting position can be inserted into the internal flow passage of the fluid pipe from the inside of the insertion guide tube via the branch port along the axis of the branch pipe portion by the push operation mechanism, and in a state in which the blockage bag is located at a predetermined internal flow passage blocking position, the axis adjustment portion is located in a portion corresponding to the branch port in a radial direction of the fluid pipe.

With this configuration, the internal flow passage of the fluid pipe and the inside of the branch pipe portion can be maintained in a sealed state essentially by the sealing case connected to the branch pipe portion and the shaft inserted into the sealing case. Moreover, the internal flow passage can be closed by the blockage bag fixed to the leading end portion of the shaft in the uninterrupted flow state in which flow of a fluid through the internal flow passage of the fluid pipe is maintained.

Moreover, the insertion guide tube is inserted into the sealing case, the shaft is inserted into the sealing case and the insertion guide tube so as to be slidable along the axis of the branch pipe portion, the blockage bag in the reduced-size state is housed in the insertion guide tube, the blockage bag is fixed to the leading end portion of the shaft, the leading end portion being located inside the insertion guide tube, and the push operation mechanism that pushes and moves the shaft against the fluid pressure inside the fluid pipe is provided.

Therefore, by sliding the shaft along the axis of the branch pipe portion using the push operation mechanism, it is possible to move the insertion guide tube that houses the blockage bag, inside the sealing case and inside the branch pipe portion along the axis of the branch pipe portion until the insertion guide tube is brought into the abutting position in which at least a part of the leading end portion of the insertion guide tube abuts against the outer surface-side peripheral edge portion of the branch port on the outer circumferential surface of the fluid pipe against the fluid pressure inside the fluid pipe. Moreover, by further sliding the shaft along the axis of the branch pipe portion using the push operation mechanism in the state in which the insertion guide tube is in the abutting position, it is possible to insert the blockage bag that is housed in the insertion guide tube into the internal flow passage of the fluid pipe from the inside of the insertion guide tube via the branch port along the axis of the branch pipe portion.

It should be noted that when the shaft that is inserted into the sealing case and the insertion guide tube is slid along the axis of the branch pipe portion, the shaft first moves relative to the sealing case but does not move relative to the insertion guide tube (the shaft moves together with the insertion guide tube). Then, after the insertion guide tube abuts against the outer surface-side peripheral edge portion of the branch port on the outer circumferential surface of the fluid pipe, the shaft moves relative to the sealing case and the insertion guide tube (only the shaft moves). In this manner, the shaft is inserted in a state in which the degree of adhesion to the insertion guide tube is higher than the degree of adhesion to the sealing case.

Thus, even in the case where the fluid pressure of the fluid flowing through the internal flow passage acts on the blockage bag in the uninterrupted flow state, the blockage bag can be moved inside the sealing case and inside the branch pipe portion along the axis of the branch pipe portion without abutting against the inner surface of the sealing case and the inner surface of the branch pipe portion, in a state in which the blockage bag is housed in the insertion guide tube until the insertion guide tube is brought into the abutting position.

In particular, in the state in which the insertion guide tube is in the abutting position, when the shaft is further slid along the axis of the branch pipe portion using the push operation mechanism, the blockage bag that is housed in the insertion guide tube is moved out of the insertion guide tube to the predetermined internal flow passage blocking position in the internal flow passage of the fluid pipe via the branch port along the axis of the branch pipe portion. At this time, the axis adjustment portion that is fixed to the leading end portion of the shaft or the base end region of the blockage bag, the leading end portion and the base end region being located inside the insertion guide tube, and that can make sliding contact with the inner surface of the insertion guide tube is located in a portion corresponding to the branch port in the radial direction of the fluid pipe.

Therefore, when the blockage bag is located at the internal flow passage blocking position, the axis adjustment portion is located in the portion corresponding to the branch port in the radial direction of the fluid pipe (portion in which the axis adjustment portion abuts against the inner circumferential surface of the branch port if the axis adjustment portion is moved in the pipe axis direction of the fluid pipe).

As a result, even when the blockage bag is pressed by the fluid pressure from the fluid flowing through the internal flow passage in the uninterrupted flow state so as to move downstream of the branch port (farther downstream in the fluid pipe than the axis of the branch pipe portion), the axis adjustment portion makes sliding contact with the inner surface of the insertion guide tube, and thus the blockage bag does not come into contact with a burr on the inner surface of the branch port or a projection etc. on the inner surface of the branch pipe portion. Furthermore, the shaft can be maintained coaxial with the axis of the branch pipe portion.

Thus, in the uninterrupted flow state, the blockage bag that is located at the internal flow passage blocking position and closes the internal flow passage can be prevented from being damaged by a burr on the inner surface of the branch port or a projection etc. on the inner surface of the branch pipe portion. Moreover, deformation and movement of the blockage bag can be reduced, so that a change in the degree of adhesion to the inner circumferential surface of the internal flow passage can be prevented.

Accordingly, a device for blocking a flow passage without interrupting flow can be obtained which, in an uninterrupted flow state in which flow of a fluid through an internal flow passage of a fluid pipe is maintained, facilitates insertion of and prevents damage to a blockage bag inserted into the internal flow passage and can furthermore reliably close the internal flow passage.

According to another aspect of this disclosure, the leading end portion of the insertion guide tube includes a step portion in which an inner diameter-side region of the insertion guide tube is formed extending beyond an outer diameter-side region of the insertion guide tube toward a leading end side, and the insertion guide tube in the abutting position is positioned in a state in which at least a part of the outer diameter-side region abuts against the outer surface-side peripheral edge portion, and at least a part of the inner diameter-side region is fitted into the branch port.

With this configuration, in the leading end portion of the insertion guide tube, the step portion, in which the inner diameter-side region of the insertion guide tube is formed extending beyond the outer diameter-side region of the insertion guide tube toward the leading end side, is formed. Therefore, the insertion guide tube can be positioned in the abutting position in which at least a part of the outer diameter-side region of the step portion abuts against the outer surface-side peripheral edge portion of the branch port on the outer circumferential surface of the fluid pipe and at least a part of the inner diameter-side region is fitted into the branch port, by moving the insertion guide tube along the axis of the branch pipe portion. It should be noted that when the insertion guide tube is configured so as to have an outer diameter slightly smaller than the inner diameter of the branch pipe portion, the insertion guide tube can be more reliably positioned by the inner surface of the branch pipe portion.

Thus, even in the case where the shaft inserted into the insertion guide tube is shifted relative to the axis of the branch pipe portion, the inner diameter-side region of the step portion formed in the insertion guide tube can be used as a guide member during insertion of the insertion guide tube into the branch port, and the shaft inserted into the insertion guide tube can be positioned coaxially with the axis of the branch pipe portion.

Moreover, since the outer diameter-side region abuts against the outer surface-side peripheral edge portion of the branch port in a state in which the inner diameter-side region of the step portion formed in the insertion guide tube is fitted into the branch port, the insertion guide tube can be reliably prevented from moving in the pipe axis direction of the fluid pipe.

Furthermore, since the inner diameter-side region of the step portion of the insertion guide tube is fitted into the branch port, the fitted region of that inner diameter-side region is in a state in which it covers the inner surface side of the branch port (inner surface side of the branch port with respect to the direction that is parallel to the pipe axis direction of the fluid pipe). As a result, during movement of the blockage bag from the inside of the insertion guide tube in the abutting position into the internal flow passage of the fluid pipe via the branch port, the blockage bag does not come into contact with a burr on the inner surface of the branch port or a projection etc. on the inner surface of the branch pipe portion, so that damage to the blockage bag can be even more reliably prevented.

An aspect of this disclosure is a device for blocking a flow passage without interrupting flow, including a blockage bag that is to be inserted into a fluid pipe via a branch port formed in the fluid pipe and that is to be deformed and expanded so as to increase in diameter to close an internal flow passage of the fluid pipe, the device including:

a sealing case that is to be detachably connected to a branch pipe portion having an attachment port portion that is integrally formed with the fluid pipe and a valve member that is attached to the attachment port portion, in a state in which the sealing case is in communication with the branch port;

an insertion guide tube that is inserted into the sealing case;

a shaft that is inserted into the sealing case and the insertion guide tube so as to be slidable along an axis of the branch pipe portion while a sealed state is maintained and that includes a through flow passage inside;

the blockage bag that is fixed to a leading end portion of the shaft, the leading end portion being located inside the insertion guide tube, and that can be deformed and elastically expanded so as to increase in diameter by a diameter-increasing fluid that is supplied via the through flow passage;

a push operation mechanism that pushes and moves the shaft against a fluid pressure inside the fluid pipe; and an axis adjustment portion that is fixed to the leading end portion of the shaft or a base end region of the blockage bag, the leading end portion and the base end region being located inside the insertion guide tube, and that can make sliding contact with an inner surface of the insertion guide tube, wherein the insertion guide tube, with the blockage bag in a reduced-size state being housed in the insertion guide tube, can be moved inside the sealing case and inside the branch pipe portion along the axis of the branch pipe portion by the push operation mechanism, until the insertion guide tube is brought into an abutting position in which at least a part of the leading end portion of the insertion guide tube abuts against an abutted portion that is formed in the attachment port portion, and the blockage bag that is housed in the insertion guide tube in the abutting position can be inserted into the internal flow passage of the fluid pipe from the inside of the insertion guide tube via the branch port along the axis of the branch pipe portion by the push operation mechanism, and in a state in which the blockage bag is located at a predetermined internal flow passage blocking position, the axis adjustment portion is located in a portion corresponding to the branch port in a radial direction of the fluid pipe.

With this configuration, the internal flow passage of the fluid pipe and the inside of the branch pipe portion can be maintained in a sealed state essentially by the sealing case, which is connected to the branch pipe portion having the attachment port portion that is integrally formed with the fluid pipe and the valve member attached to the attachment port portion in a state in which the sealing case is in communication with the branch port, and the shaft, which is inserted into the sealing case. Moreover, the internal flow passage can be closed by the blockage bag, which is fixed to the leading end portion of the shaft, in the uninterrupted flow state in which flow of the fluid through the internal flow passage of the fluid pipe is maintained.

Moreover, the insertion guide tube is inserted into the sealing case, the shaft is inserted into the sealing case and the insertion guide tube so as to be slidable along the axis of the branch pipe portion, the blockage bag in the reduced-size state is housed in the insertion guide tube, the blockage bag is fixed to the leading end portion of the shaft, the leading end portion being located inside the insertion guide tube, and the push operation mechanism that pushes and moves the shaft against the fluid pressure inside the fluid pipe is provided.

Therefore, by sliding the shaft along the axis of the branch pipe portion using the push operation mechanism, it is possible to move the insertion guide tube that houses the blockage bag, inside the sealing case and inside the branch pipe portion along the axis of the branch pipe portion against the fluid pressure inside the fluid pipe until the insertion guide tube is brought into the abutting position in which at least a part of the leading end portion of the insertion guide tube abuts against the abutted portion formed in the attachment port portion. Moreover, by further sliding the shaft along the axis of the branch pipe portion using the push operation mechanism in the state in which the insertion guide tube is in the abutting position, it is possible to insert the blockage bag that is housed in the insertion guide tube into the internal flow passage of the fluid pipe from the inside of the insertion guide tube via the branch port along the axis of the branch pipe portion.

It should be noted that when the shaft that is inserted into the sealing case and the insertion guide tube is slid along the axis of the branch pipe portion, the shaft first moves relative to the sealing case but does not move relative to the insertion guide tube (the shaft moves together with the insertion guide tube). Then, after the insertion guide tube abuts against the abutted portion formed in the attachment port portion, the shaft moves relative to the sealing case and the insertion guide tube (only the shaft moves). In this manner, the shaft is inserted in a state in which the degree of adhesion to the insertion guide tube is higher than the degree of adhesion to the sealing case.

Thus, even in the case where the fluid pressure of the fluid flowing through the internal flow passage acts on the blockage bag in the uninterrupted flow state, the blockage bag can be moved inside the sealing case and inside the branch pipe portion along the axis of the branch pipe portion without abutting against the inner surface of the sealing case and the inner surface of the branch pipe portion, in a state in which the blockage bag is housed in the insertion guide tube until the insertion guide tube is brought into the abutting position.

In particular, when the shaft is further slid along the axis of the branch pipe portion using the push operation mechanism in the state in which the insertion guide tube is in the abutting position, the blockage bag that is housed in the insertion guide tube is moved out of the insertion guide tube to the predetermined internal flow passage blocking position in the internal flow passage of the fluid pipe via the branch port along the axis of the branch pipe portion. At this time, the axis adjustment portion, which is fixed to the leading end portion of the shaft or the base end region of the blockage bag, the leading end portion and the base end region being located inside the insertion guide tube, and can make sliding contact with the inner surface of the insertion guide tube, is located in the portion corresponding to the branch port in the radial direction of the fluid pipe.

Therefore, when the blockage bag is located at the internal flow passage blocking position, the axis adjustment portion is located in the portion corresponding to the branch port in the radial direction of the fluid pipe (portion in which the axis adjustment portion abuts against the inner circumferential surface of the branch port if the axis adjustment portion is moved in the pipe axis direction of the fluid pipe). As a result, even when the blockage bag is pressed by the fluid pressure from the fluid flowing through the internal flow passage in the uninterrupted flow state so as to move downstream of the branch port (farther downstream in the fluid pipe than the axis of the branch pipe portion), the axis adjustment portion makes sliding contact with the inner surface of the insertion guide tube, and thus the blockage bag does not come into contact with burr on the inner surface of the branch port or a projection etc. on the inner surface of the branch pipe portion. Furthermore, the shaft can be maintained coaxial with the axis of the branch pipe portion.

Thus, in the uninterrupted flow state, the blockage bag located at the internal flow passage blocking position and closing the internal flow passage can be prevented from being damaged by burr on the inner surface of the branch port or a projection etc. on the inner surface of the branch pipe portion. Moreover, deformation and movement of the blockage bag can be reduced, so that a change in the degree of adhesion to the inner circumferential surface of the internal flow passage can be prevented.

Accordingly, a device for blocking a flow passage without interrupting flow can be obtained which, in a uninterrupted flow state in which flow of a fluid through an internal flow passage of a fluid pipe is maintained, facilitates insertion of and prevents damage to a blockage bag inserted into the internal flow passage and can furthermore reliably close the internal flow passage.

According to another aspect of this disclosure, the axis adjustment portion is configured by an axis adjustment tube member that is formed to have an outer diameter substantially equal to an inner diameter of the insertion guide tube, and a mouthpiece member including a fluid supply/discharge passage that is in communication with the through flow passage and having an outer surface that makes sliding contact with an inner surface of the axis adjustment tube member is provided in the base end region of the blockage bag, the mouthpiece member being disposed fitted into the axis adjustment tube member.

With this configuration, the mouthpiece member including the fluid supply/discharge passage that is in communication with the through flow passage formed inside the shaft is provided in the base end region of the blockage bag, and the mouthpiece member is disposed so as to be fitted into the axis adjustment tube member that is formed to have an outer diameter substantially equal to the inner diameter of the insertion guide tube and that serves as the axis adjustment portion. Therefore, in the uninterrupted flow state, deformation and movement of the blockage bag located at the internal flow passage blocking position and closing the internal flow passage can be even more reliably reduced, and a change in the degree of adhesion to the inner circumferential surface of the internal flow passage can be even more reliably prevented, by using the mouthpiece member that is fixed to the leading end portion of the shaft in a state in which the diameter-increasing fluid supplied from the through flow passage can be supplied into and discharged from the blockage bag.

That is to say, the mouthpiece member having the outer surface that can make sliding contact with the inner surface of the axis adjustment tube member is fitted into the axis adjustment tube member that can make sliding contact with the inner surface of the insertion guide tube. Therefore, even when the blockage bag that is located at the internal flow passage blocking position is pressed by the fluid pressure from the fluid flowing through the internal flow passage in the uninterrupted flow state so as to move downstream of the branch port (farther downstream in the fluid pipe than the axis of the branch pipe portion), the outer surface of the mouthpiece member makes sliding contact with the inner surface of the axis adjustment tube member, and also the outer surface of the axis adjustment tube member makes sliding contact with the inner surface of the insertion guide tube. As a result, the blockage bag and the shaft can be even more reliably prevented from moving close to the branch port in the pipe axis direction of the fluid pipe.

Thus, in the uninterrupted flow state, the shaft can be reliably maintained coaxial with the axis of the branch pipe portion, deformation and movement of the blockage bag located at the internal flow passage blocking position and closing the internal flow passage can be even more reliably reduced, a change in the degree of adhesion to the inner circumferential surface of the internal flow passage can be even more reliably prevented, and thus the internal flow passage can be even more reliably closed.

According to another aspect of this disclosure, in a state in which the blockage bag is located at the internal flow passage blocking position, a leading end of the axis adjustment portion and an inner end of the branch port in the radial direction of the fluid pipe are located at the same position in the radial direction of the fluid pipe.

With this configuration, in the state in which the blockage bag is located at the internal flow passage blocking position, the leading end of the axis adjustment portion and the inner end of the branch port in the radial direction of the fluid pipe are located at the same position in the radial direction of the fluid pipe. Therefore, a situation in which while the axis adjustment portion is located at the position corresponding to the branch port in the radial direction of the fluid pipe, the leading end of the axis adjustment portion protrudes farther inward, with respect to the radial direction, or retracts farther outward, with respect to the radial direction, relative to the inner end (the same position as the inner circumferential surface of the fluid pipe in the radial direction) of the branch port in the radial direction does not occur, and thus favorable flow of the fluid through the internal flow passage of the fluid pipe can be maintained.

According to another aspect of this disclosure, an insertion position restricting portion is formed on an outer circumferential surface of the shaft, protruding outward in the radial direction of the shaft, and in accordance with an operation for pushing the shaft by the push operation mechanism, the insertion position restricting portion abuts against an outer surface of a bottom portion of the insertion guide tube in the abutting position and restricts an insertion state of the blockage bag inserted into the fluid pipe to the internal flow passage blocking position.

With this configuration, the insertion position restricting portion is formed on the outer circumferential surface of the shaft, protruding outward in the radial direction of the shaft. Therefore, when the blockage bag is moved out of the insertion guide tube in the abutting position into the internal flow passage of the fluid pipe via the branch port, the insertion position restricting portion abuts against the outer surface of the bottom portion of the insertion guide tube in the abutting position in accordance with the operation for pushing the shaft by the push operation mechanism, and can restrict the insertion state of the blockage bag inserted into the fluid pipe to the internal flow passage blocking position.

Thus, during insertion of the blockage bag into the internal flow passage of the fluid pipe, the blockage bag can be readily and reliably located at the predetermined internal flow passage blocking position in the internal flow passage by the insertion position restricting portion simply abutting against the outer surface of the bottom portion of the insertion guide tube in the abutting position.

According to another aspect of this disclosure, the sealing case includes an internal space having a length that allows at least the insertion guide tube and the blockage bag that is moved out of the insertion guide tube to be housed in the internal space.

With this configuration, the sealing case includes the internal space having a length that allows at least the insertion guide tube and the blockage bag that is moved out of the insertion guide tube to be housed in the internal space. Therefore, even in the case where the blockage bag is not housed in the insertion guide tube after withdrawal of the shaft along the axis of the branch pipe portion from the state in which the blockage bag is moved out of the insertion guide tube by performing the operation for pushing the shaft (e.g., state in which the blockage bag is moved out of the insertion guide tube and located at the predetermined internal flow passage blocking position in the internal flow passage), the insertion guide tube and the blockage bag can be housed in the internal space formed in the sealing case.

Thus, the sealing case can be removed from the branch pipe portion in a state in which the insertion guide tube and the blockage bag are entirely housed in the internal space of the sealing case. That is to say, during removal, carrying-out, transport, etc. of the sealing case, the blockage bag can be favorably prevented from coming into contact with and being damaged by an object etc.

According to another aspect of this disclosure, the blockage bag is configured such that the blockage bag can be deformed and elastically expanded outward in a pipe axis direction and the radial direction, of the fluid pipe after being inserted to the internal flow passage blocking position in the internal flow passage of the fluid pipe along the axis of the branch pipe portion, and is configured such that the deformation and elastic expansion of the blockage bag allows the blockage bag to close the internal flow passage of the fluid pipe in a state in which the blockage bag blocks an inner surface-side peripheral edge portion of the branch port on an inner circumferential surface of the fluid pipe.

With this configuration, after being inserted to the internal flow passage blocking position in the internal flow passage of the fluid pipe along the axis of the branch pipe portion, the blockage bag is deformed and elastically expanded outward in the pipe axis direction and the radial direction, of the fluid pipe at the internal flow passage blocking position that is located on the axis of the branch pipe portion, and thus the internal flow passage of the fluid pipe is closed in a state in which the blockage bag blocks the inner surface-side peripheral edge portion of the branch port on the inner circumferential surface of the fluid pipe.

Thus, even in the uninterrupted flow state, the branch port and the internal flow passage can be easily and reliably closed by simply deforming and elastically expanding the blockage bag that is inserted to the internal flow passage blocking position and that is maintained coaxial with the axis of the branch pipe portion by the axis adjustment portion.

According to another aspect of this disclosure, annular sealing portions are provided on an outer circumferential surface of the blockage bag, protruding from respective positions that are located on opposite sides of the shaft in the pipe axis direction, and when the blockage bag is deformed and elastically expanded, the annular sealing portions are brought into pressure contact with the inner circumferential surface of the fluid pipe over the entire circumference and frictionally hold the blockage bag.

With this configuration, the annular sealing portions are provided on the outer circumferential surface of the blockage bag, protruding from the respective positions that are located on opposite sides of the shaft in the pipe axis direction, and when the blockage bag is deformed and elastically expanded at the internal flow passage blocking position, the annular sealing portions are brought into pressure contact with the inner circumferential surface of the fluid pipe over the entire circumference and frictionally hold the blockage bag. Therefore, even when the blockage bag is pressed by the fluid pressure from the fluid flowing through the internal flow passage in the uninterrupted flow state so as to move downstream of the branch port (farther downstream in the fluid pipe than the axis of the branch pipe portion), the friction of both of the annular sealing portions with the inner circumferential surface of the fluid pipe can even more reliably prevent the blockage bag from moving downstream in the fluid pipe.

Moreover, even in the case where a burr, a projection, etc., or peeling of mortar, or the like is present in the inner surface-side peripheral edge portion of the branch port on the inner circumferential surface of the fluid pipe, the water stopping ability is not degraded because the annular sealing portions are brought into pressure contact with the inner circumferential surface of the fluid pipe at respective positions that are shifted from the inner surface-side peripheral edge portion in the pipe axis direction of the fluid pipe.

In addition, even in the case where the inner surface-side peripheral edge portion of the branch port on the inner circumferential surface of the fluid pipe is formed into the shape of a curved surface that is curved toward the branch port, the water stopping ability is not degraded because the annular sealing portions are brought into pressure contact with the inner circumferential surface of the fluid pipe at respective positions that are shifted from the inner surface-side peripheral edge portion in the pipe axis direction of the fluid pipe.

DESCRIPTION OF EMBODIMENTS

FIGS. 1 to 10 illustrate a flow passage blocking method that uses a device A for blocking a flow passage without interrupting flow, the device A including a blockage bag 4 that is to be inserted into a water pipe (an example of a fluid pipe) 1 made of cast iron and constituting a part of fluid pipeline, via a hole (an example of a branch port) 2 formed in the water pipe 1, and that is to be deformed and expanded so as to increase in diameter to close an internal flow passage 3 of the water pipe 1, and in which the internal flow passage 3 is closed in an uninterrupted water flow state (an example of an uninterrupted flow state) in which flow of service water (an example of a fluid) Q flowing through the inside of the water pipe 1 is maintained.

It should be noted that the flow passage blocking method using the above-described flow passage blocking device A is carried out in order to close the internal flow passage 3 of the water pipe 1 in the vicinity of the hole 2 using the blockage bag 4, and thereby perform replacement work, repair work, etc. of the water pipe 1, a fire hydrant (not shown), etc. that has reached the end of its service life or that is due for replacement due to leakage, a breakdown, etc. caused by deterioration, in a region downstream of that portion of the internal flow passage 3 that is closed by the blockage bag 4, in a state in which water flow continues uninterrupted.

Figure 1:
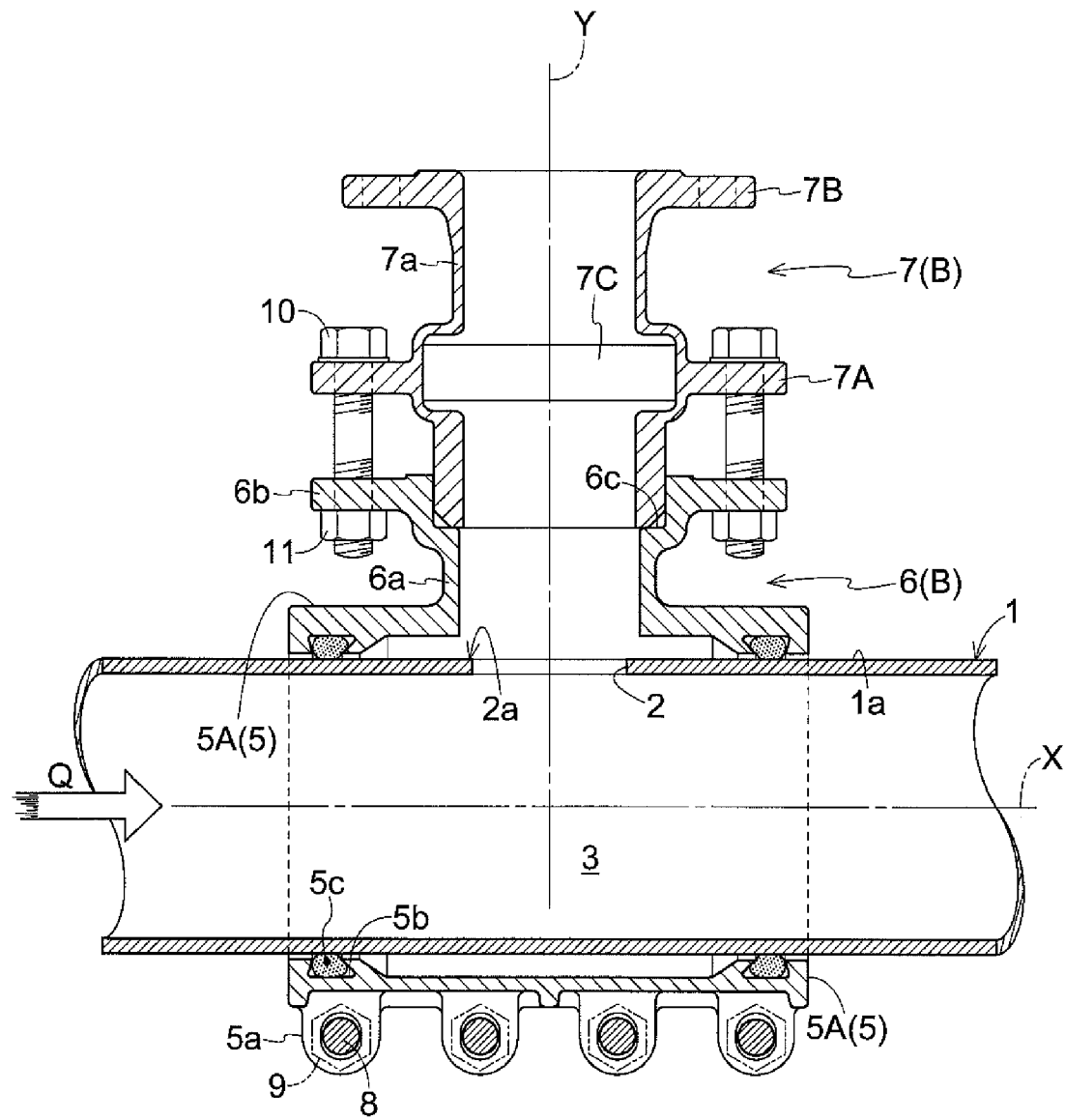
FIG. 1 is a longitudinal cross-sectional view showing a fluid pipeline to which a branch pipe portion communicating with a hole is connected.

Specifically, first, as shown in FIG. 1, a branch pipe portion connecting step is performed in which a split T-shaped pipe (an example of a T-shaped fitting) 5 having a split structure is installed in a watertight state on a predetermined area (area containing a portion in which the hole 2 is intended to be formed) of the water pipe 1 that is upstream of a portion with respect to which replacement work etc. of a fire hydrant etc. is to be performed, and a gate valve (an example of a valve member) 7 is connected in a watertight state to a valve attachment port portion (an example of an attachment port portion) 6 of this split T-shaped pipe 5.

The split T-shaped pipe 5 is composed of three partial-cylinder-shaped split fitting bodies 5A that can be installed on the water pipe 1 from the outside in a radial direction and into which the split T-shaped pipe 5 is divided in a circumferential direction of the pipe. Also, in both end portions of each split fitting body 5A in the circumferential direction of the pipe, coupling flange portions 5a for detachably fixing and coupling adjacent end portions of the split fitting bodies 5A externally installed on the water pipe 1 to each other by means of multiple bolts 8 and nuts 9 are integrally formed.

Moreover, a seal material 5c made of synthetic rubber is fitted into a seal holding groove 5b formed in an inner surface of each split fitting body 5A, the seal material 5c sealing a space between the split fitting body 5A and an outer circumferential surface 1a of the water pipe 1 in a watertight state. Also, in a central portion of one of the split fitting bodies 5A, a cylindrical, valve attachment port portion 6 whose inner diameter is larger than the diameter of the hole 2 is integrally formed in a state in which the valve attachment port portion 6 protrudes outward in the radial direction of the water pipe 1.

The valve attachment port portion 6 includes a pipe portion 6a that is in communication with the hole 2 of the water pipe 1 and that has an inner diameter larger than the diameter of the hole 2, a coupling flange portion 6b that is formed in a downstream end portion of the pipe portion 6a, and an annular recessed groove 6c that is formed in an inner diameter-side region of the coupling flange portion 6b and that is engageable with an upstream end portion of a tubular portion 7a of the gate valve 7.

A coupling flange portion 7A that is formed in an intermediate region of the tubular portion 7a of the gate valve 7 in a longitudinal direction and that protrudes therefrom is detachably fastened to the coupling flange portion 6b of the valve attachment port portion 6 using bolts 10 and nuts 11.

The gate valve 7 includes the tubular portion 7a that is formed to have an inner diameter larger than the inner diameter of the hole 2, which will be described later, and slightly smaller than the inner diameter of the pipe portion 6a of the valve attachment port portion 6, the upstream-side coupling flange portion 7A that is formed in the intermediate region of the tubular portion 7a in the longitudinal direction and that is detachably fastened and coupled to the coupling flange portion 6b of the pipe portion 6a using the bolts 10 and nuts 11 in a watertight state in which the upstream end portion of the tubular portion 7a is engaged with the annular recessed groove 6c of the valve attachment port portion 6 via an O-ring (not shown), a downstream-side coupling flange portion 7B that is detachably fastened and coupled to a coupling flange portion 20A of a sealing case 20 of the flow passage blocking device A, which will be described later, in a watertight state by means of bolts 12 and nuts 13, and a valve element 7C that can obstruct the flow passage in the tubular portion 7a between the coupling flange portion 7A and the coupling flange portion 7B.

That is to say, the valve attachment port portion 6 and the gate valve 7 of the split fitting body 5A function as a branch pipe portion B, and a flow passage that communicates with an outer circumferential surface (the portion in which the hole 2 is intended to be formed) of the water pipe 1 is formed inside the branch pipe portion B, extending along an axis Y.

Next, a hole forming device, which has a known configuration and is thus omitted from the drawings for simplicity of description, is fastened and coupled to the downstream-side coupling flange portion 7B of the gate valve 7, and the hole 2 having a circular shape is formed in a pipe wall of the water pipe 1 by a hole saw of the hole forming device.

Specifically, the hole forming device includes a casing having a bottomed tubular shape, the casing including a coupling flange portion that can be coupled to the downstream-side coupling flange portion 7B of the gate valve 7 in a watertight state by means of bolts and nuts, and the hole saw (cylindrical rotary cutter) that is inserted into a bottom portion of the casing and that can be moved in the casing in the longitudinal direction of the casing and can be rotated.

Then, a hole forming step is performed in which the coupling flange portion of the casing is fastened and coupled to the coupling flange portion 7B of the gate valve 7 in a state in which the valve element 7C is closed, in a watertight state by means of the bolts and nuts, the hole saw of the hole forming device is advanced along the axis Y of the branch pipe portion B via the tubular portion 7a of the gate valve 7, the valve element 7C that has been opened, and the pipe portion 6a of the valve attachment port portion 6, and the circular hole 2 is formed in the pipe wall of the water pipe 1. It should be noted that after the formation of the hole 2, the hole saw and the circular cut piece are retracted into the casing and the valve element 7C is closed, the fastening and coupling between the coupling flange of the casing and the coupling flange portion 7B of the gate valve 7 is released, and the hole forming device is removed from the gate valve 7.

Subsequently, as shown in FIGS. 2 to 7, the flow passage blocking device A is connected to the gate valve 7 in a watertight state, and an internal flow passage blocking step is performed. The configuration of the flow passage blocking device A will be described first.

Figure 2:
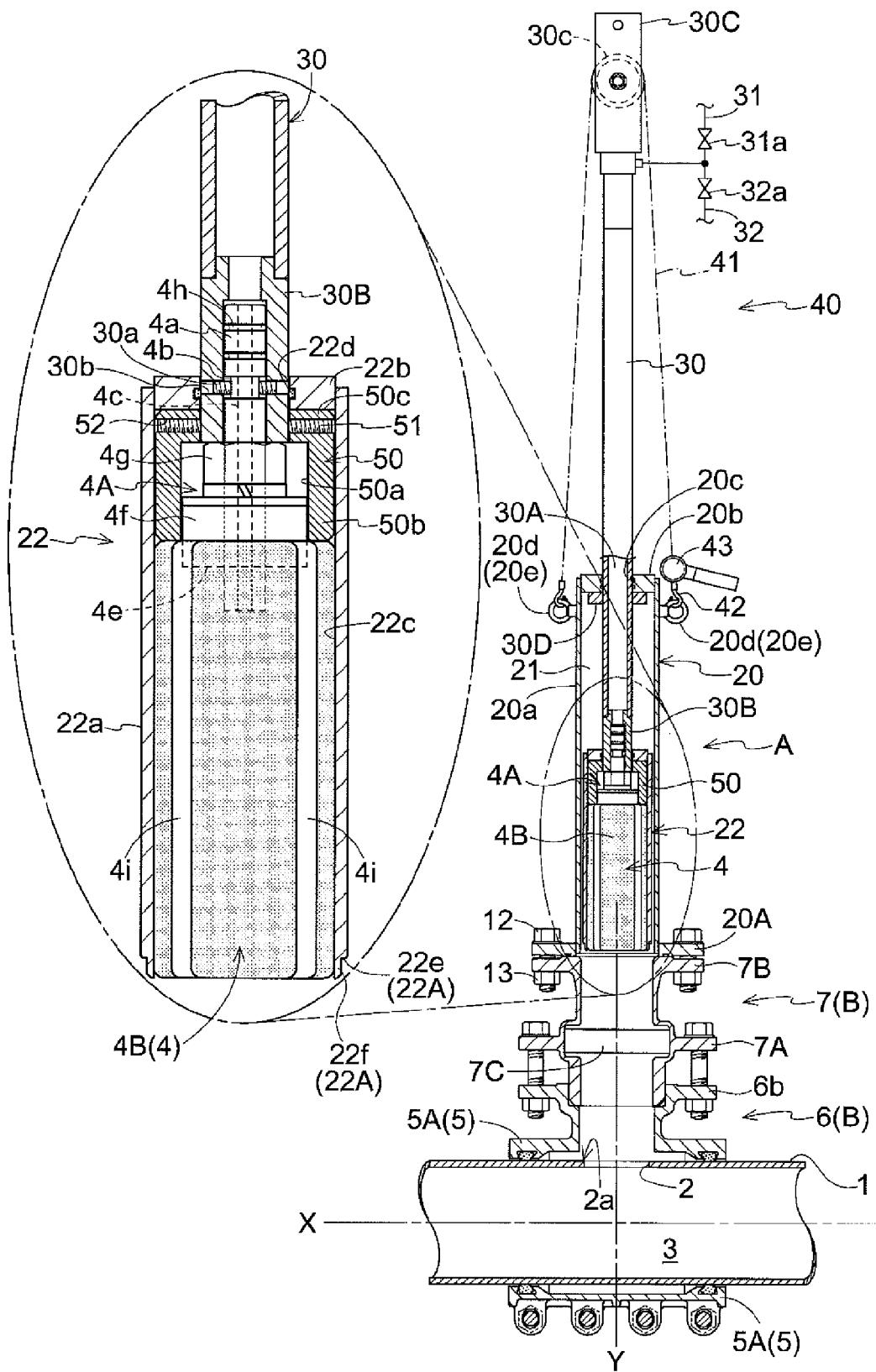
FIG. 2 is a longitudinal cross-sectional view showing a state in which a device for blocking a flow passage without interrupting water flow is connected to the branch pipe portion.

As shown in FIG. 2, the flow passage blocking device A includes the sealing case 20 that is in communication with the hole 2 and that is detachably connected to the branch pipe portion B having the gate valve 7, an insertion guide tube 22 that is inserted into the sealing case 20, a tubular shaft (an example of a shaft) 30 that is inserted into the sealing case 20 and the insertion guide tube 22 so as to be slidable along the axis Y of the branch pipe portion B while a sealed state is maintained, and that includes a through flow passage 30A inside, a blockage bag 4 that is fixed to a leading end portion 30B of the tubular shaft 30, the leading end portion 30B being located inside the insertion guide tube 22, and that can be deformed and elastically expanded so as to increase in diameter by a diameter-increasing fluid P that is supplied via the through flow passage 30A, a push operation mechanism 40 that pushes and moves the tubular shaft 30 against the fluid pressure inside the water pipe 1, and an axis adjustment tube member (an example of an axis adjustment portion) 50 that is fixed to the leading end portion 30B of the tubular shaft 30, the leading end portion 30B being located inside the insertion guide tube 22, and that can make sliding contact with an inner surface 22c of the insertion guide tube 22.

The sealing case 20 is formed into a bottomed tubular shape including a tubular wall 20a that is formed to have an inner diameter substantially equal to the inner diameter of the tubular portion 7a of the gate valve 7 and a bottom wall portion 20b that blocks a downstream end portion of the tubular wall 20a, and includes an internal space 21 having a length that allows the insertion guide tube 22, which will be described later, and the blockage bag 4 that is moved out of the insertion guide tube 22 to be housed in the internal space 21. The coupling flange portion 20A that is detachably fastened and coupled to the downstream-side coupling flange portion 7B of the gate valve 7 in a watertight state by means of the bolts 12 and nuts 13 is formed in an upstream end portion of the tubular wall 20a. The tubular shaft 30 fitted with, at its leading end portion 30B, the blockage bag 4 for blocking the internal flow passage 3 of the water pipe 1 is inserted into the bottom wall portion 20b so as to be slidable while a sealed state is maintained by an annular seal member 20c.

Moreover, the sealing case 20 is provided with eyenuts 20e each including an annular locking portion 20d, the eyenuts 20e being fixed to respective regions on the outer circumferential surface of the tubular wall 20a that are near the bottom wall portion 20b and that oppose each other across the tubular shaft 30, using appropriate fixing mechanisms (not shown), such as bolts, that are secured to the outer circumferential surface of the tubular wall 20a.

The insertion guide tube 22 is formed into a bottomed tubular shape including a tube wall portion 22a that is formed to have an outer diameter slightly smaller than the inner diameter of the tubular portion 7a of the gate valve 7 and a bottom wall portion 22b that blocks a downstream end portion of the tube wall portion 22a, and the insertion guide tube 22 includes an internal space (not shown) in which the axis adjustment tube member 50, which will be described later, and the blockage bag 4 can be housed. The tubular shaft 30 fitted with, at its leading end portion 30B, the blockage bag 4 for blocking the internal flow passage 3 of the water pipe 1 is inserted into the bottom wall portion 22b so as to be slidable while a sealed state is maintained by an annular elastic holding member 22d. The elastic holding member 22d is composed of rubber or the like that frictionally holds the bottom wall portion 22b of the insertion guide tube 22 and the tubular shaft 30 and that is capable of preventing the bottom wall portion 22b of the insertion guide tube 22 and the tubular shaft 30 from being scratched when the insertion guide tube 22 and the tubular shaft 30 are moved relative to each other. It should be noted that the tubular shaft 30 is inserted into the insertion guide tube 22 and the sealing case 20 such that the degree of adhesion to (degree of frictional holding of) the outer circumferential surface of the tubular shaft 30, of the elastic holding member 22d of the bottom wall portion 22b of the insertion guide tube 22 is higher than the degree of adhesion to (degree of frictional holding of) the outer circumferential surface of the tubular shaft 30, of the annular seal member 20c of the bottom wall portion 20b of the sealing case 20.

Moreover, a step portion 22A is provided in the upstream end portion (leading end portion) of the insertion guide tube 22, in which an inner diameter-side region 22f of the insertion guide tube 22 extends beyond an outer diameter-side region 22e of the insertion guide tube 22 toward the leading end side. The outer diameter-side region 22e is formed to have an outer diameter slightly larger than the inner diameter of the hole 2, and the inner diameter-side region 22f is formed to have an outer diameter slightly smaller than the inner diameter of the hole 2. Thus, a configuration is achieved in which the insertion guide tube 22 can be positioned inside the branch pipe portion B in an abutting position in which at least a part of the outer diameter-side region 22*e* abuts against an outer surface-side peripheral edge portion 2*a* of the hole 2 on an outer circumferential surface 1*a* of the water pipe 1, and at least a part of the inner diameter-side region 22*f* is fitted into the hole 2.

The tubular shaft 30 is formed into a tubular shape and includes the through flow passage 30A inside. The tubular shaft 30 is inserted into the bottom wall portion 20*b* of the sealing case 20 and the bottom wall portion 22*b* of the insertion guide tube 22 so as to be slidable along the axis Y of the branch pipe portion B while a sealed state is maintained.

The leading end portion 30B of the tubular shaft 30 is configured such that a fitting tube portion 4*a* of a mouthpiece member 4A provided in a base end region of the blockage bag 4 can be internally fitted therein. Also, a pair of screw holes 30*b* into which respective set screws 30*a* can be screwed is formed in the leading end portion 30B of the tubular shaft 30, penetrating the tubular shaft 30 in the radial direction. Thus, the blockage bag 4 can be fixed to the leading end portion 30B of the tubular shaft 30 in a water-tight state by screwing the set screws 30*a* into the respective screw holes 30*b*, in a state in which the fitting tube portion 4*a* is internally fitted into the leading end portion 30B of the tubular shaft 30, until leading end portions of the set screws 30*a* abut against and are locked in a locking step portion 4*b* that is formed in the fitting tube portion 4*a*.

A rear end portion 30C of the tubular shaft 30 blocks the through flow passage 30A and is composed of a pulley mounting member including a pulley 30*c* that is pivotally supported so as to be rotatable about a rotation shaft (not shown). A chain (or a wire etc.) 41 of the push operation mechanism 40, which will be described later, can extend between the pair of annular locking portions 20*d* of the sealing case 20 via this pulley 30*c*.

A supply passage 31 through which the diameter-increasing fluid P is supplied from a source of supply (not shown) outside the tubular shaft 30 to the through flow passage 30A via a supply valve 31*a* as well as a discharge passage 32 through which the diameter-increasing fluid P in the through flow passage 30A is discharged via a discharge valve 32*a* are provided upstream of the rear end portion 30C of the tubular shaft 30.

Moreover, a pair of insertion position restricting protrusions (an example of an insertion position restricting portion) 30D is formed on the outer circumferential surface of the tubular shaft 30, protruding outward in the radial direction of the tubular shaft 30 from respective positions opposing each other across the tubular shaft 30. The insertion position restricting protrusions 30D are configured such that when the tubular shaft 30 slides along the axis Y of the branch pipe portion B, these protrusions abut against the outer surface (outer surface of a bottom portion) of the bottom wall portion 22*b* of the insertion guide tube 22, thereby restricting an insertion state of the tubular shaft 30 to a fully inserted position (restricting an insertion state of the blockage bag 4 inserted into the water pipe 1 such that the blockage bag 4 is located at an internal flow passage blocking position).

The blockage bag 4 is fixed to the leading end portion 30B of the tubular shaft 30, the leading end portion 30B being located inside the insertion guide tube 22, and is configured such that the blockage bag 4 can be deformed and elastically expanded so as to increase in diameter by the diameter-increasing fluid P that is supplied via the through flow passage 30A. It should be noted that a gas such as compressed air or a liquid such as water can be used as the diameter-increasing fluid P as long as the internal flow passage 3 can be closed by that fluid being supplied into the blockage bag 4 and thereby deforming and elastically expanding the blockage bag 4.

Specifically, the blockage bag 4 includes a bag main body 4B that can be deformed and elastically expanded so as to increase in diameter by the diameter-increasing fluid P, and the mouthpiece member 4A including a fluid supply/discharge passage 4*c* through which the diameter-increasing fluid P can be supplied into and discharged from the bag main body 4B via the through flow passage 30A.

The bag main body 4B is formed into a bag shape and has a double structure composed of an inner bag (not shown) made of rubber such as natural rubber, synthetic rubber, or the like and an outer bag (not shown) formed of a fibrous member such as cloth, rubber, or the like, or a flexible member obtained by integrating such materials in a laminated state. It should be noted that instead of the double structure, a single structure or a triple or higher multiple structure may also be adopted.

A first end side of the mouthpiece member 4A is internally fitted into the leading end portion 30B of the tubular shaft 30, and a second end side of the mouthpiece member 4A penetrates the bag main body 4B and is located inside the bag main body 4B. In this state, the mouthpiece member 4A includes the fitting tube portion 4*a* that includes the fluid supply/discharge passage 4*c* inside, a cylindrical screwing member 4*e* inside the bag, the screwing member 4*e* being located inside the bag main body 4B and screwed on a male thread (not shown) that is formed on a second end-side outer surface of the fitting tube portion 4*a*, a cylindrical attachment member 4*f* outside the bag, the attachment member 4*f* being fitted to the first end side of the fitting tube portion 4*a* that is located outside the bag main body 4B and holding a part of the bag main body 4B between the screwing member 4*e* inside the bag and the attachment member 4*f*, and a fixing nut 4*g* that is screwed on a male thread portion (not shown) formed on a first end-side outer surface of the fitting tube portion 4*a* that is located outside the bag main body 4B, and fastens and fixes the attachment member 4*f* outside the bag to the screwing member 4*e* inside the bag.

The fitting tube portion 4*a* is disposed such that the longitudinal direction thereof coincides with the longitudinal direction (direction of the axis Y of the branch pipe portion B) of the tubular shaft 30. In a state in which no diameter-increasing fluid P is supplied into the bag main body 4B, the bag main body 4B can be folded around an end portion of the fitting tube portion 4*a* on the second end side extending into the bag main body 4B to a bar-shaped, reduced-size state. When the bag main body 4B is folded to the bar-shaped, reduced-size state, the outer diameter of the bag main body 4B is slightly smaller than the inner diameter of the insertion guide tube 22, and thus the bag main body 4B can be housed in the insertion guide tube 22. It should be noted that in the present embodiment, the bag main body 4B that is housed in the insertion guide tube 22 is in a state in which the outer surface of the bag main body 4B closely adheres to (is frictionally held by) the inner surface 22*c* of the insertion guide tube 22.

On the other hand, in a state in which the diameter-increasing fluid P is supplied into the bag main body 4B, the bag main body 4B is deformed and elastically expanded so as to increase in diameter and have a substantially cylindrical bag shape (see FIG. 6), and the bag main body 4B at this time has such an outer diameter that the outer circumferential surface thereof can favorably closely adhere to the inner circumferential surface of the internal flow passage 3. That is to say, when the bag main body 4B is deformed and elastically expanded to the substantially cylindrical shape, the bag main body 4B is deformed and expanded such that the diameter of the cylinder increases in the longitudinal direction of the fitting tube portion 4a (longitudinal direction of the tubular shaft 30) and the height of the cylinder increases in a direction that is perpendicular to the longitudinal direction of the fitting tube portion 4a.

In addition, annular sealing portions 4i are formed on the outer circumferential surface of the bag main body 4B (blockage bag 4), protruding from respective positions that are located on opposite sides of the fitting tube portion 4a (tubular shaft 30) in the direction perpendicular to the longitudinal direction of the fitting tube portion 4a, and when the blockage bag 4 is deformed and elastically expanded, the annular sealing portions 4i are brought into pressure contact with the inner circumferential surface of the water pipe 1 over the entire circumference in the circumferential direction, thereby frictionally holding the blockage bag 4.

On the first end-side outer surface of the fitting tube portion 4a, the locking step portion 4b that is recessed radially inward from that outer surface is formed at a position that is the same position as the screw holes 30b, which are formed penetrating the leading end portion 30B, when an end portion of the fitting tube portion 4a on the first end side is internally fitted into the leading end portion 30B of the tubular shaft 30. A pair of O-rings 4h is disposed on the outer surface of the fitting tube portion 4a that is closer to that end portion than the locking step portion 4b is, the O-rings 4h maintaining a watertight state between that outer surface and the inner surface of the through flow passage 30A in the leading end portion 30B of the tubular shaft 30.

The attachment member 4f outside the bag is formed to have an outer diameter slightly smaller than the inner diameter of the axis adjustment tube member 50, which will be described later, so that the attachment member 4f is internally fitted into the axis adjustment tube member 50. The outer surface of the attachment member 4f outside the bag can make sliding contact with an inner surface 50a of the axis adjustment tube member 50.

The push operation mechanism 40 is configured to push and move the tubular shaft 30 against the fluid pressure inside the water pipe 1, and includes a pair of hook members 42 that can be locked in the pair of annular locking portions 20d provided on the sealing case 20, the single chain (or wire etc.) 41 that is hooked to the pair of annular locking portions 20d with the hook members 42 via the pulley 30c mounted in the rear end portion 30C of the tubular shaft 30, and an operating lever 43 for performing a winding-up operation to tighten the chain 41. It should be noted that the operating lever 43 is configured by a Lever Block (registered trademark, the same applies hereinafter) that not only can be operated to wind up and tighten the chain 41 but also can keep the position of the chain 41 in a tightened position and can be operated to release the tightened chain 41.

The axis adjustment tube member 50 is fixed to the leading end portion 30B, of the tubular shaft 30, that is located inside the insertion guide tube 22, and inserted into the insertion guide tube 22 in a state in which the outer surface of the axis adjustment tube member 50 can make sliding contact with the inner surface 22c of the insertion guide tube 22.

Specifically, the axis adjustment tube member 50 is formed into a bottomed tubular shape including a tube wall portion 50b that is formed to have an outer diameter slightly smaller than the inner diameter of the insertion guide tube 22 and an inner diameter slightly larger than the outer diameter of the attachment member 4f outside the bag, and a bottom wall portion 50c into which the leading end portion 30B of the tubular shaft 30 is inserted.

A pair of screw holes 52 into which respective set screws 51 can be screwed is formed in the bottom wall portion 50c, penetrating the bottom wall portion 50c in the radial direction of the axis adjustment tube member 50 (radial direction of the tubular shaft 30). Thus, the axis adjustment tube member 50 can be fixed to the leading end portion 30B of the tubular shaft 30 by screwing each of the set screws 51 into the corresponding screw hole 52 until a leading end portion of the set screw 51 abuts against and is locked on the outer circumferential surface of the leading end portion 30B of the tubular shaft 30.

In a state in which the axis adjustment tube member 50 is fixed to the leading end portion 30B of the tubular shaft 30 in the above-described manner, at least a part of the inner surface 50a of the tube wall portion 50b of the axis adjustment tube member 50 is located in close proximity to a radially outer side of the outer surface of the attachment member 4f outside the bag, of the mouthpiece member 4A.

Then, as shown in FIG. 2, the coupling flange portion 20A of the sealing case 20 of the flow passage blocking device A having the above-described configuration is fastened and coupled to the downstream-side coupling flange portion 7B of the gate valve 7 in a watertight state by means of the bolts 12 and nuts 13.

In this state, the insertion guide tube 22 that houses the blockage bag 4 in the reduced-size state is housed in the internal space 21 of the sealing case 20 in a state in which the leading end of the inner diameter-side region 22f of the step portion 22A of the insertion guide tube 22 is located near the coupling flange portion 20A of the sealing case 20 and also upper surfaces of the respective insertion position restricting protrusions 30D of the tubular shaft 30 are located in positions at which those upper surfaces abut against an inner surface of the bottom wall portion 20b of the sealing case 20. That is to say, the insertion guide tube 22 is housed in the internal space 21 of the sealing case 20 such that in the direction along the axis Y of the branch pipe portion B, the distance between a lower surface of each insertion position restricting protrusion 30D and the outer surface of the bottom wall portion 22b of the insertion guide tube 22 is equal to the distance for which, after the insertion guide tube 22 reaches an abutting position in which the step portion 22A of the insertion guide tube 22 abuts against the outer surface-side peripheral edge portion 2a of the hole 2, the tubular shaft 30 is inserted to the fully inserted position (internal flow passage blocking position).

Figure 3:
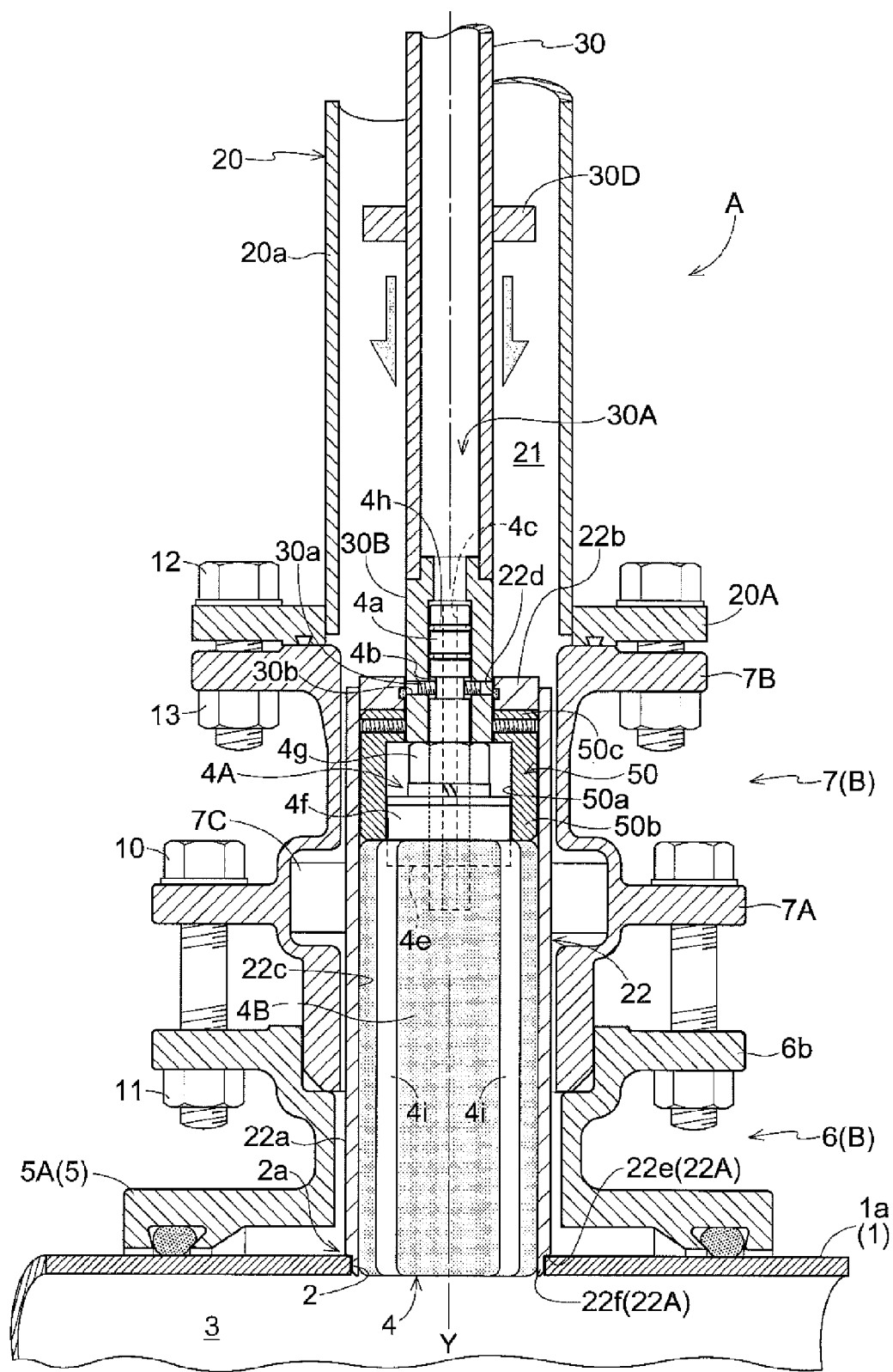
FIG. 3 is a longitudinal cross-sectional view showing a state in which an insertion guide tube is brought into an abutting position by performing an operation for pushing a tubular shaft.

Next, as shown in FIG. 3, an operation for opening the valve element 7C is performed, an operation for winding up and tightening the chain 41 is performed using the operating lever 43 of the push operation mechanism 40, and then an operation for pushing the tubular shaft 30 against the fluid pressure of the service water Q flowing through the internal flow passage 3 so as to move the tubular shaft 30 along the axis Y of the branch pipe portion B into the internal flow passage 3 via the tubular portion 7a and the valve element 7C of the gate valve 7 as well as the pipe portion 6a of the valve attachment port portion 6 is performed.

When the tubular shaft 30 is slid along the axis Y of the branch pipe portion B in this manner, as shown in FIG. 3, the tubular shaft 30 moves together with the insertion guide tube 22 in a state in which the tubular shaft 30 moves relative to the sealing case 20 but does not move relative to the insertion guide tube 22, and the insertion guide tube 22 is brought into an abutting position in which at least a part of the step portion 22A abuts against the outer surface-side peripheral edge portion 2a of the hole 2 on the outer circumferential surface 1a of the water pipe 1.

In this abutting position, the insertion guide tube 22 is positioned in a state in which at least a part of the outer diameter-side region 22e of the step portion 22A abuts against the outer surface-side peripheral edge portion 2a and at least a part of the inner diameter-side region 22f is fitted into the hole 2. Moreover, the outer diameter of the insertion guide tube 22 is slightly smaller than the inner diameter of the branch pipe portion B. Therefore, the insertion guide tube 22 is more reliably positioned by the inner surface of the branch pipe portion B.

Thus, even in the case where the fluid pressure of the service water Q flowing through the internal flow passage 3 acts on the blockage bag 4 in the uninterrupted flow state, the blockage bag 4 can be moved inside the sealing case 20 and inside the branch pipe portion B along the axis Y of the branch pipe portion B without abutting against the inner surface of the sealing case 20 and the inner surface of the branch pipe portion B, while the blockage bag 4 remains in a state in which it is housed in the insertion guide tube 22 until the insertion guide tube 22 is brought into the abutting position.

Moreover, even in the case where the tubular shaft 30 inserted into the insertion guide tube 22 is misaligned relative to the axis Y of the branch pipe portion B, the inner diameter-side region 22f of the step portion 22A that is formed in the insertion guide tube 22 can be used as a guide member during insertion of the insertion guide tube 22 into the hole 2, and the tubular shaft 30 inserted into the insertion guide tube 22 can be positioned coaxially with the axis Y of the branch pipe portion B.

Furthermore, since the outer diameter-side region 22e of the step portion 22A that is formed in the insertion guide tube 22 abuts against the outer surface-side peripheral edge portion 2a of the hole 2 in a state in which the inner diameter-side region 22f is fitted into the hole 2, the insertion guide tube 22 can be reliably prevented from moving in the direction of a pipe axis X of the water pipe 1.

In addition, since the inner diameter-side region 22f of the step portion 22A of the insertion guide tube 22 is fitted into the hole 2, the inner diameter-side region 22f covers an inner surface side of the hole 2 (inner surface side of the hole 2 in a direction that is parallel to the direction of the pipe axis X of the water pipe 1) in a region where the inner diameter-side region 22f is fitted. As a result, as described later, during movement of the blockage bag 4 from the inside of the insertion guide tube 22 in the abutting position into the internal flow passage 3 of the water pipe 1 via the hole 2, the blockage bag 4 does not come into contact with a burr on the inner surface of the hole 2 or a projection etc. on the inner surface of the branch pipe portion B, and therefore damage to the blockage bag 4 can be even more reliably prevented.

After that, the chain 41 is further wound up and tightened using the operating lever 43 of the push operation mechanism 40 to push the tubular shaft 30 along the axis Y of the branch pipe portion B against the fluid pressure of the service water Q flowing through the internal flow passage 3.

Figure 4:
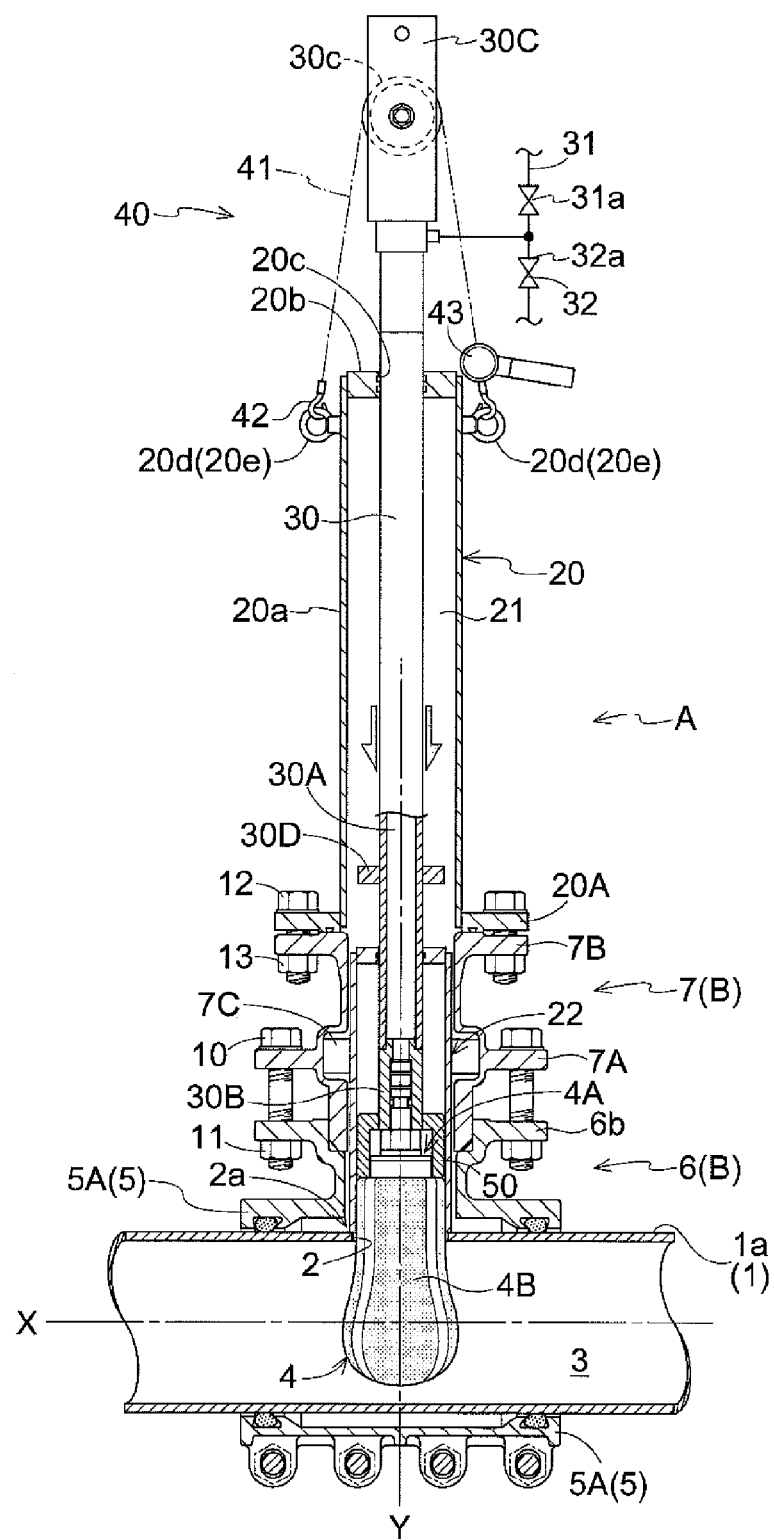
FIG. 4 is a longitudinal cross-sectional view showing a process by which a blockage bag is inserted into an internal flow passage by performing an operation for further pushing the tubular shaft.

When the tubular shaft 30 is slid further toward the internal flow passage 3 along the axis Y of the branch pipe portion B in this manner in the state in which the insertion guide tube 22 is in the abutting position, as shown in FIG. 4, the tubular shaft 30 moves relative to the sealing case 20 and the insertion guide tube 22, and only the blockage bag 4 and the axis adjustment tube member 50, which are fixed to the leading end portion 30B of the tubular shaft 30, move into the internal flow passage 3 along the axis Y of the branch pipe portion B.

Figure 5:
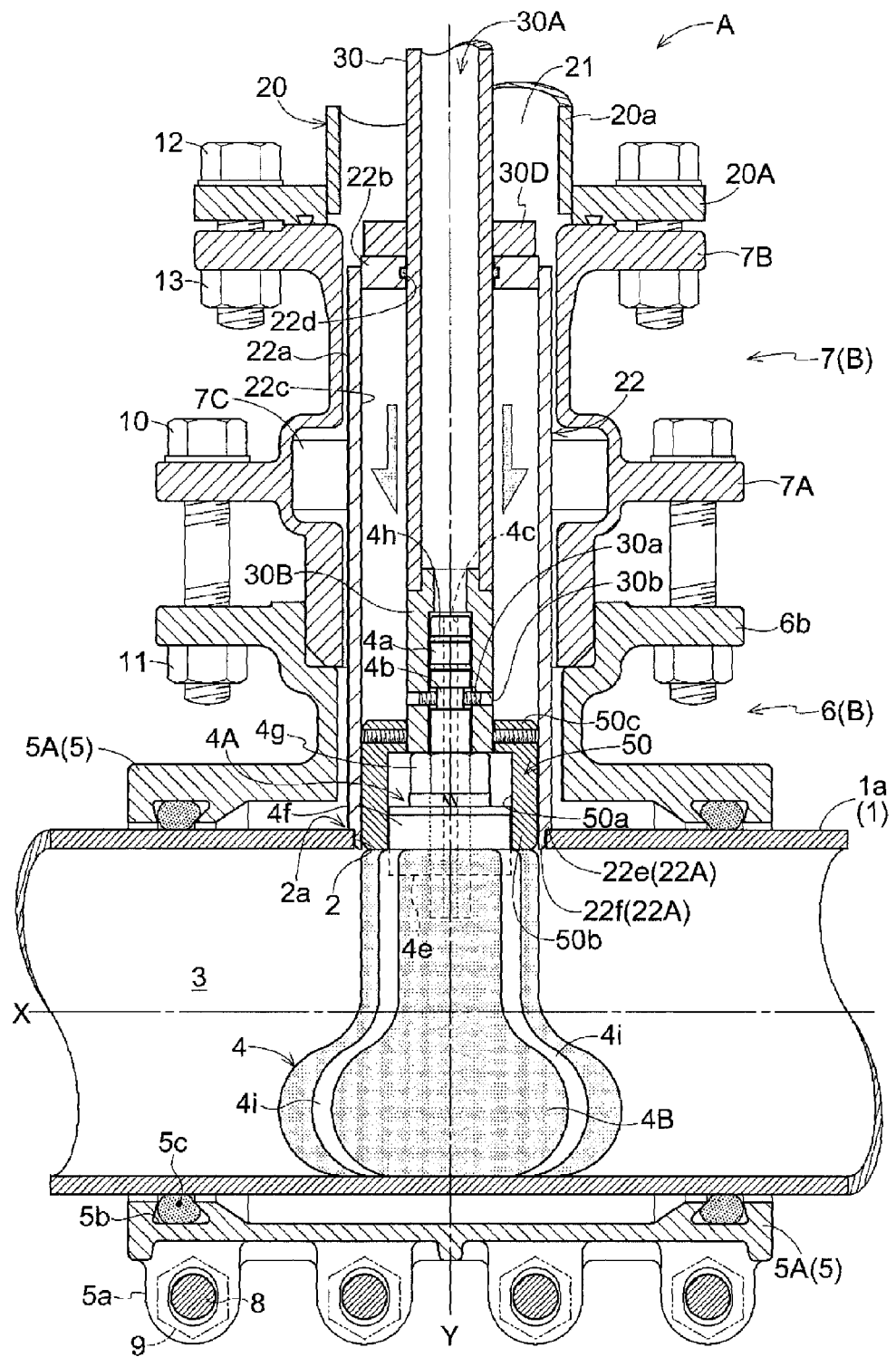
FIG. 5 is a longitudinal cross-sectional view showing a state in which insertion position restricting protrusions abut against an outer surface of a bottom portion of the insertion guide tube, and the blockage bag is located at an internal flow passage blocking position.

As shown in FIG. 5, this push operation is continued until the lower surfaces of the respective insertion position restricting protrusions 30D of the tubular shaft 30 abut against the outer surface of the bottom wall portion 22b of the insertion guide tube 22. That is to say, the push operation is continued until an insertion state of the tubular shaft 30 in which the tubular shaft 30 is located at the fully inserted position (the blockage bag 4 is located at the internal flow passage blocking position) is achieved.

In this state, the blockage bag 4 is located at the intended internal flow passage blocking position in the internal flow passage 3, the axis adjustment tube member 50 is located in a portion corresponding to the hole 2 in the radial direction of the water pipe 1 (portion in which the axis adjustment tube member 50 abuts against the inner circumferential surface of the hole 2 if the axis adjustment tube member 50 is moved in the direction of the pipe axis X of the water pipe 1), and the leading end of the axis adjustment tube member 50 and an inner end of the hole 2 in the radial direction of the water pipe 1 are located at the same position in the radial direction of the water pipe 1 (see FIG. 5). In other words, the leading end of the axis adjustment tube member 50 is disposed flush with the inner circumferential surface of the water pipe 1.

Therefore, even when the blockage bag 4 is pressed by the fluid pressure from the service water Q flowing through the internal flow passage 3 in the uninterrupted flow state so as to move downstream of the hole 2 (farther downstream in the water pipe 1 than the axis Y of the branch pipe portion B), the outer surface of the attachment member 4f outside the bag, of the mouthpiece member 4A makes sliding contact with the inner surface 50a of the axis adjustment tube member 50, and also the outer surface of the axis adjustment tube member 50 makes sliding contact with the inner surface of the insertion guide tube 22. Therefore, the blockage bag 4 does not come into contact with a burr on the inner surface of the hole 2 or a projection etc. on the inner surface of the branch pipe portion B, and furthermore, the tubular shaft 30 can be maintained coaxial with the axis Y of the branch pipe portion B.

Figure 6:
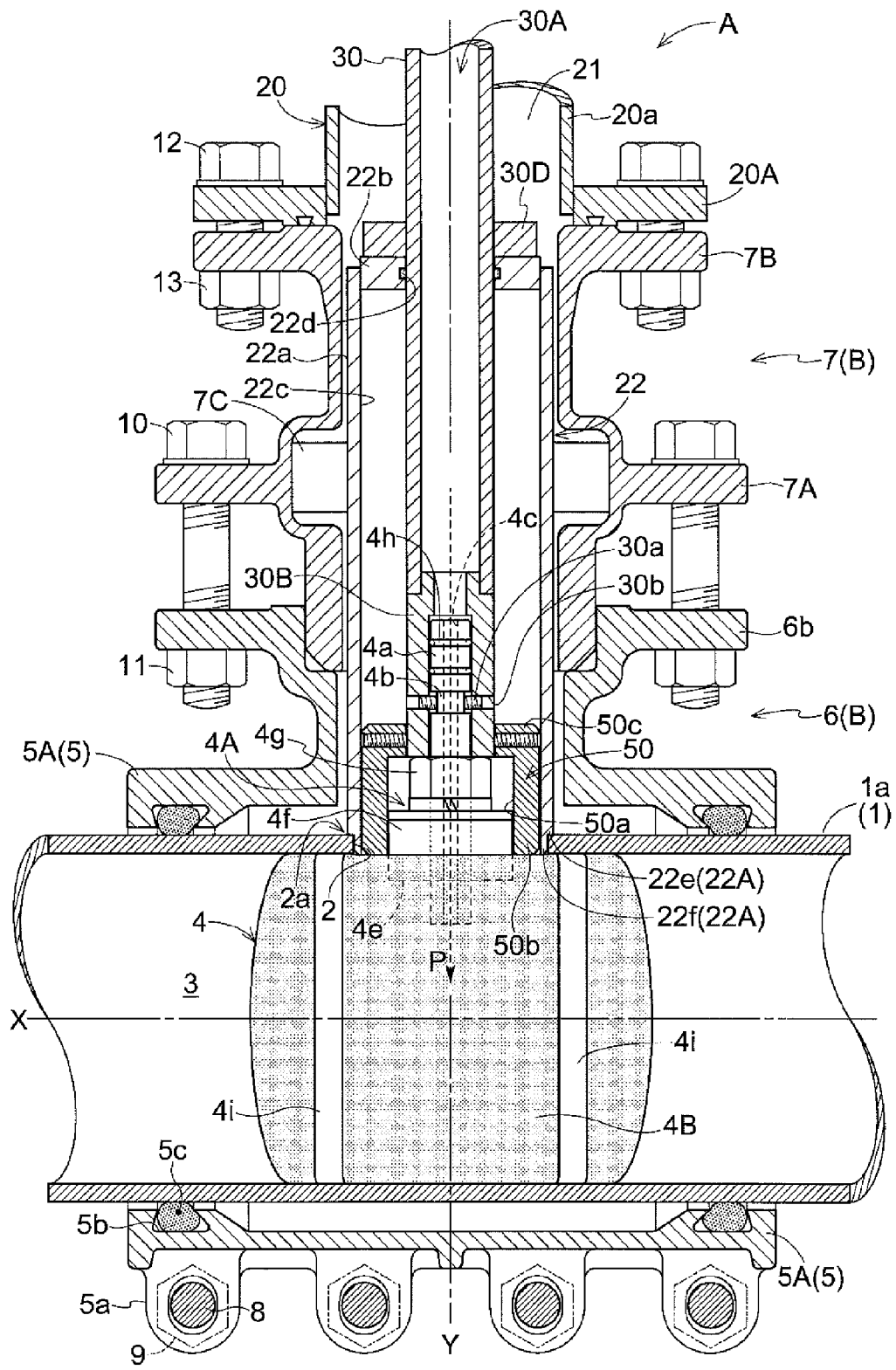
FIG. 6 is a longitudinal cross-sectional view showing a state in which the blockage bag located at the internal flow passage blocking position is deformed and elastically expanded.

Subsequently, as shown in FIG. 6, the supply valve 31a is opened, and a predetermined amount of diameter-increasing fluid P is supplied into the bag main body 4B of the blockage bag 4 located at the internal flow passage blocking position via the supply passage 31, the through flow passage 30A, and the fluid supply/discharge passage 4c to deform and elastically expand the bag main body 4B outward in the direction of the pipe axis X and the radial direction, of the water pipe 1. When the bag main body 4B is deformed and elastically expanded so as to have a substantially cylindrical shape, the bag main body 4B is deformed and expanded such that the diameter of the cylinder increases in a plane containing the longitudinal direction of the fitting tube portion 4a (longitudinal direction of the tubular shaft 30) and the height of the cylinder increases in a direction that is perpendicular to the plane containing the longitudinal direction of the fitting tube portion 4a.

When the bag main body 4B at the internal flow passage blocking position is deformed and elastically expanded in this manner, the internal flow passage 3 of the water pipe 1 is closed in a state in which the outer circumferential surface of the bag main body 4B blocks an inner surface-side peripheral edge portion of the hole 2 on the inner circumferential surface of the water pipe 1, and the annular sealing portions 4i, which are provided at the respective positions on the outer circumferential surface of the bag main body 4B (blockage bag 4) that are located on opposite sides of the fitting tube portion 4a (tubular shaft 30) in the direction of the pipe axis X of the water pipe 1, are brought into pressure contact with the inner circumferential surface of the water pipe 1 over the entire circumference. It should be noted that when the blockage bag 4 has been deformed and elastically expanded to a sufficient extent, the supply valve 31a is closed.

Figure 7:
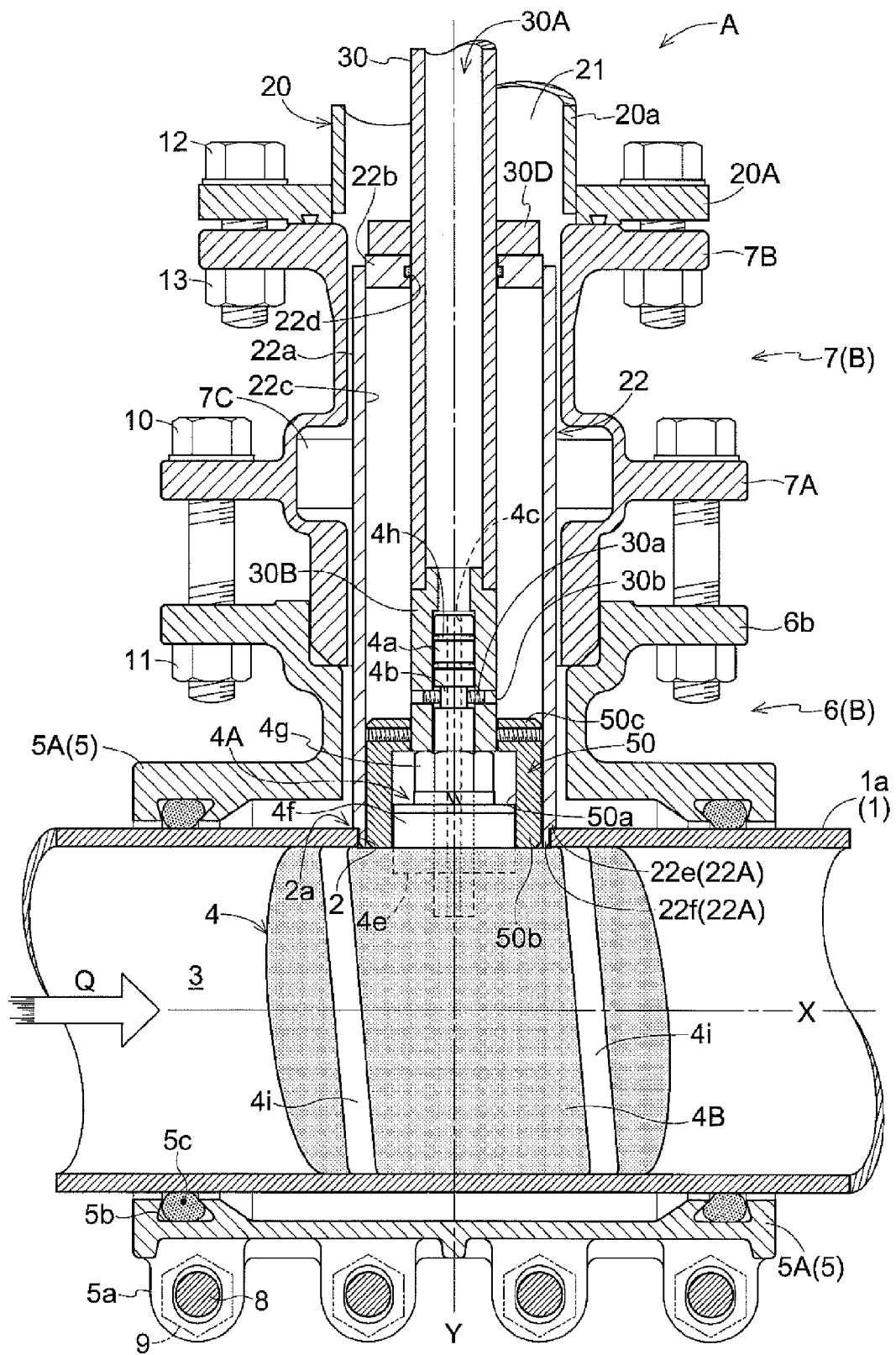
FIG. 7 is a longitudinal cross-sectional view showing a state in which a fluid pressure acts on the blockage bag that is deformed and elastically expanded.

Thus, as shown in FIG. 7, even in the uninterrupted flow state in which the fluid pressure of the service water Q flowing through the water pipe 1 acts on the blockage bag 4, the axis adjustment tube member 50 maintains the fitting tube portion 4a of the blockage bag 4 and the tubular shaft 30 coaxial with the axis Y of the branch pipe portion B as described above, so that the blockage bag 4 can be prevented from moving from the internal flow passage blocking position, and the blockage bag 4 can be prevented from coming into contact with and damaged by a burr on the inner surface of the hole 2 or a projection etc. on the inner surface of the branch pipe portion B. Moreover, it is possible to reduce deformation and movement of the blockage bag 4 and thereby prevent a change in the degree of adhesion to the inner circumferential surface of the internal flow passage 3.

Also, even in the uninterrupted flow state, the hole 2 and the internal flow passage 3 can be easily and reliably closed by simply deforming and elastically expanding the blockage bag 4 that is inserted to the internal flow passage blocking position and that is maintained coaxial with the axis Y of the branch pipe portion B by the axis adjustment tube member 50. Furthermore, due to the friction of the two annular sealing portions 4i with the inner circumferential surface of the water pipe 1, the blockage bag 4 can be even more reliably prevented from moving downstream of the water pipe 1, so that a change in the degree of adhesion to the inner circumferential surface of the internal flow passage 3 can be even more reliably prevented.

Figure 8:
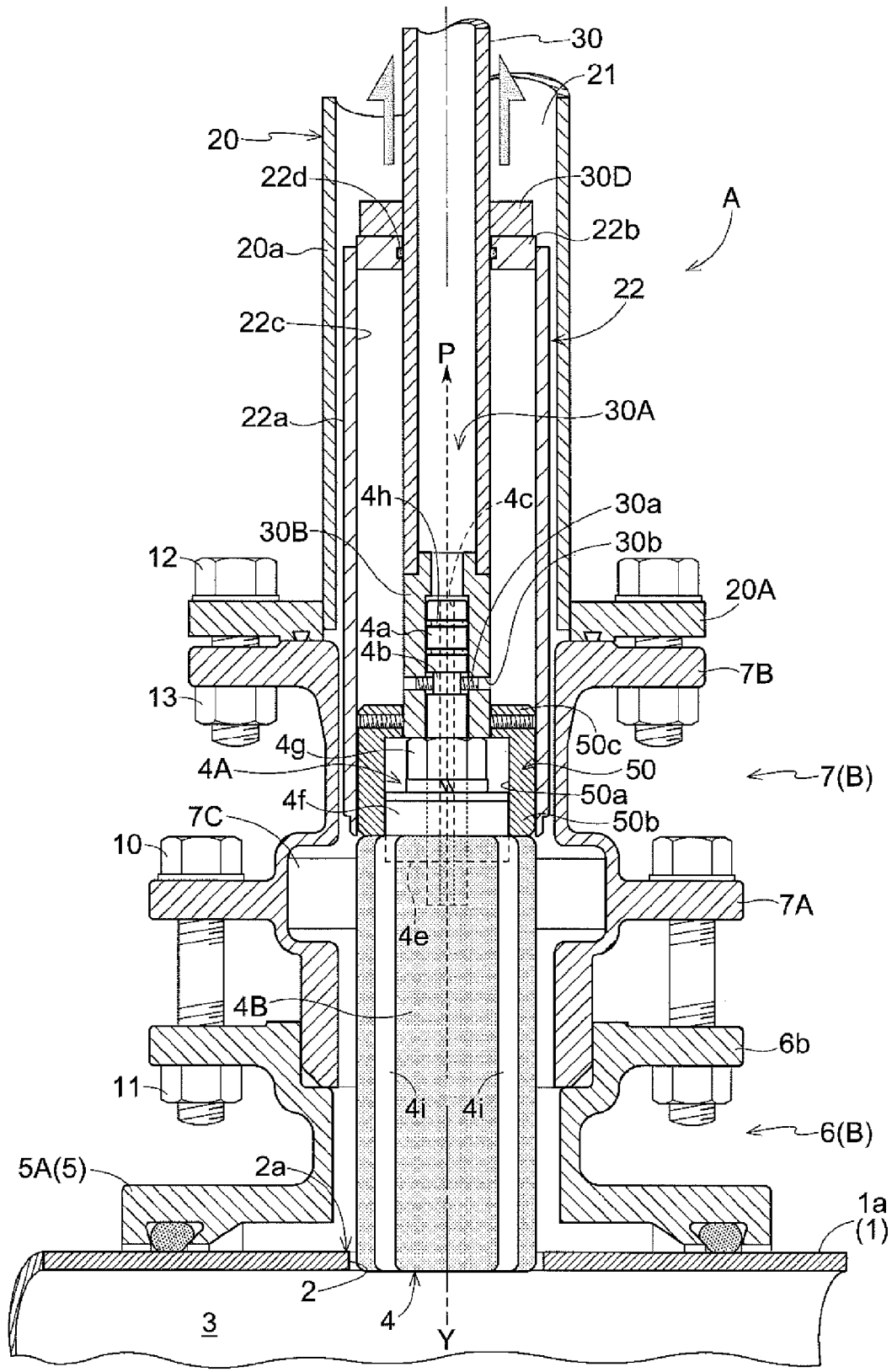
FIG. 8 is a longitudinal cross-sectional view showing a process by which the tubular shaft is withdrawn, and the blockage bag is retracted from the internal flow passage blocking position into the sealing case.

Next, when an operation such as replacement of a fire hydrant etc. at a location, for example, downstream of the portion where the internal flow passage 3 is closed by the blockage bag 4 has been finished, as shown in FIG. 8, the discharge valve 32a is opened to discharge the diameter-increasing fluid P in the bag main body 4B to the outside via the fluid supply/discharge passage 4c, the through flow passage 30A, and the discharge passage 32 and thereby reduce the size of the bag main body 4B inward in the direction of the pipe axis X and the radial direction, of the water pipe 1. To discharge the fluid, the fluid may be suctioned in a forcible manner using a pump etc., or a configuration may be adopted in which the fluid is open to the atmosphere.

When the size of the blockage bag 4 is reduced, an operation for releasing the position of the chain 41 that is kept in the tightened state is performed using the operating lever 43 of the push operation mechanism 40, and the tubular shaft 30 is withdrawn along the axis Y of the branch pipe portion B using a crane etc. (not shown).

It should be noted that the use of the crane etc. is not necessary in the case where the fluid pressure of the service water Q flowing through the internal flow passage 3 allows the tubular shaft 30 to be withdrawn along the axis Y of the branch pipe portion B by simply performing the operation for releasing the position of the chain 41 that is kept in the tightened state using the operating lever 43 of the push operation mechanism 40. However, even in this case, the crane etc. may also be used for safety.

Figure 9:
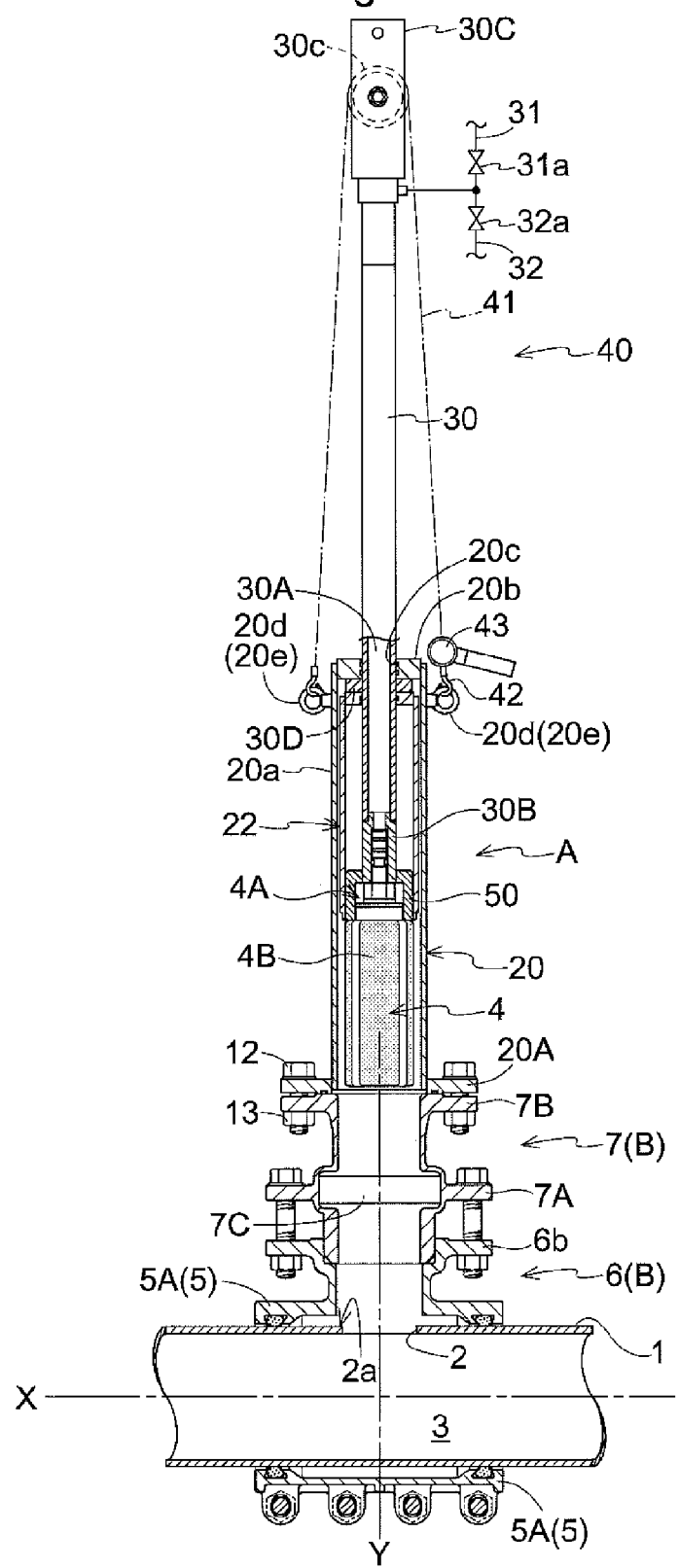
FIG. 9 is a longitudinal cross-sectional view showing a state in which the insertion guide tube and the blockage bag are housed in the sealing case.

As shown in FIG. 9, when the tubular shaft 30 is withdrawn, the tubular shaft 30, the blockage bag 4, the axis adjustment tube member 50, and the insertion guide tube 22 move together to the side of the sealing case 20 along the axis Y of the branch pipe portion B in a state in which the tubular shaft 30 moves relative to the sealing case 20 but does not move relative to the blockage bag 4 and the axis adjustment tube member 50, which are fixed to the leading end portion 30B of the tubular shaft 30, as well as the insertion guide tube 22. That is to say, the insertion guide tube 22 and the blockage bag 4 move inside the branch pipe portion B and inside the sealing case 20 along the axis Y of the branch pipe portion B in a state in which the blockage bag 4 is moved out of the insertion guide tube 22 (state in which the blockage bag 4 is not housed in the insertion guide tube 22) and in a state in which the axis adjustment tube member 50 is located inside, and near the leading end portion of, the insertion guide tube 22.

Figure 10:
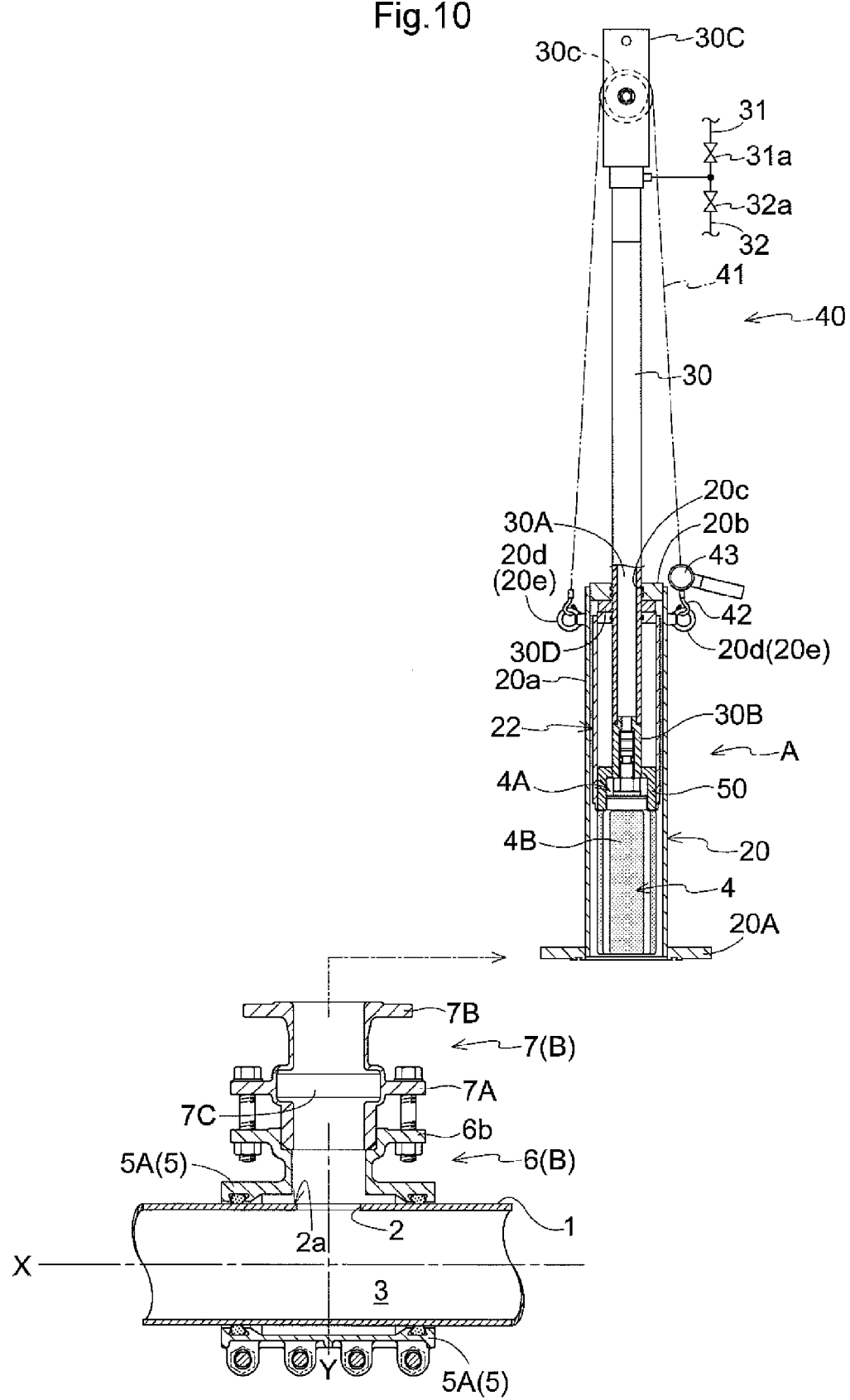
FIG. 10 is a longitudinal cross-sectional view showing a state in which the device for blocking a flow passage without interrupting water flow is removed from the branch pipe portion.

Then, as shown in FIG. 10, when the upper surfaces of the respective insertion position restricting protrusions 30D of the tubular shaft 30 abut against the inner surface of the bottom wall portion 20b of the sealing case 20 in a state in which the lower surfaces of the respective insertion position restricting protrusions 30D abut against the outer surface of the bottom wall portion 22b of the insertion guide tube 22, the whole of the blockage bag 4 and the insertion guide tube 22 is entirely housed in the internal space 21 of the sealing case 20. It should be noted that at this time, the whole of the insertion guide tube 22 and the blockage bag 4 may be not entirely housed in the internal space 21 of the sealing case 20, or in other words, the leading end (a part) of the blockage bag 4 may protrude from the internal space 21 of the sealing case 20 and be located at a position that is inside the tubular portion 7a of the gate valve 7 and at which the blockage bag 4 does not interfere with the valve element 7C.

After that, an operation for closing the valve element 7C is performed, the fastening and coupling with the bolts 12 and nuts 13 is released, and the coupling flange portion 20A of the sealing case 20 in which the insertion guide tube 22 and the blockage bag 4 are housed in the internal space 21 is removed from the coupling flange portion 7B of the gate valve 7.

Thus, even in the case where the blockage bag 4 is not housed in the insertion guide tube 22 after the withdrawal of the tubular shaft 30 along the axis Y of the branch pipe portion B from the state in which the blockage bag 4 is moved out of the insertion guide tube 22 by performing the operation for pushing the tubular shaft 30 and is located at the predetermined internal flow passage blocking position in the internal flow passage 3, the insertion guide tube 22 and the blockage bag 4 can be housed in the internal space 21 formed in the sealing case 20. That is to say, the sealing case 20 can be removed from the branch pipe portion B in a state in which the insertion guide tube 22 and the blockage bag 4 are entirely housed in the internal space 21 of the sealing case 20. Therefore, during removal, carrying-out, transport, etc. of the sealing case 20, the blockage bag 4 can be favorably prevented from coming into contact with and being damaged by an object etc.

Accordingly, the blockage bag 4 does not come into contact with or is not caught on a burr etc. of the hole 2 or a projection etc. of the branch pipe portion B during insertion into the internal flow passage 3 via the hole 2, and also does not come into contact with an object etc. during removal etc., during which time the blockage bag 4 is housed in the sealing case 20. Thus, the blockage bag 4 is prevented from being scratched or damaged and can be favorably reused.

Figure 11:
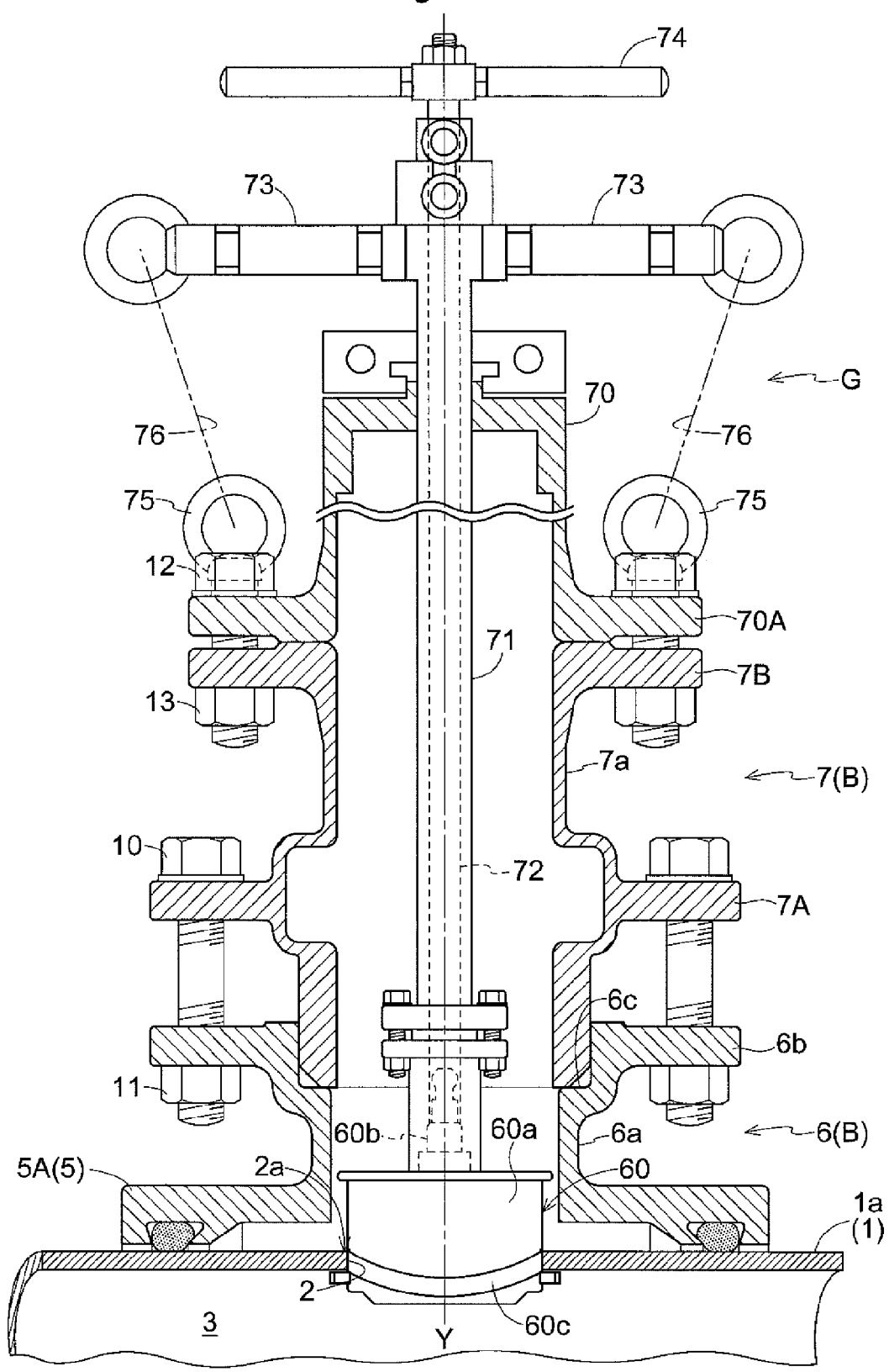
FIG. 11 is a longitudinal cross-sectional view showing a state in which an inner plug is attached to the hole.
Figure 12:
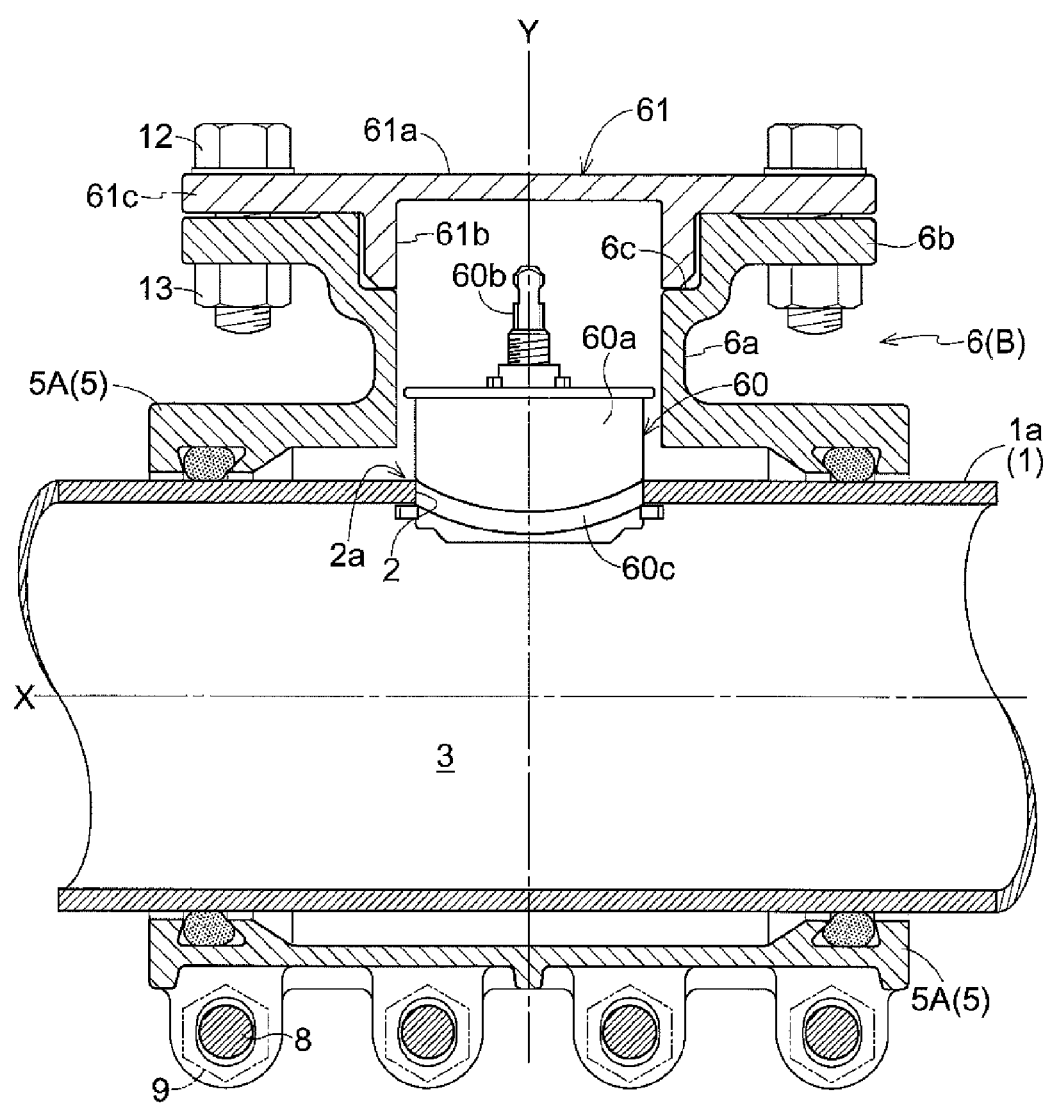
FIG. 12 is a longitudinal cross-sectional view showing a state in which the inner plug and a lid are attached to the hole.

Next, as shown in FIGS. 11 and 12, a sealing step of sealing the hole 2 with an inner plug 60 using an inner plug insertion machine G and then sealing the valve attachment port portion 6 with a lid 61 is performed.

As shown in FIG. 11, this inner plug insertion machine G includes a case portion 70 having a bottomed tubular shape and including a coupling flange portion 70A that is detachably fastened and coupled to the coupling flange portion 7B of the gate valve 7 in a watertight state by means of the bolts 12 and nuts 13, an outer shaft 71 that is slidably inserted into a bottom wall portion of the case portion 70 while the watertight state is maintained, an inner shaft 72 that is inserted into the outer shaft 71, a pair of fixed rods 73 that is mounted on a rear end portion of the outer shaft 71, a handle 74 that is mounted on a rear end portion of the inner shaft 72 at a position rearward of the fixed rods 73 of the outer shaft 71, a pair of fixed rings 75 that is mounted on the coupling flange portion 70A, and a pair of chains (or wires etc.) 76, each of the chains 76 extending between one of the pair of fixed rods 73 and the corresponding one of the pair of fixed rings 75.

The inner plug 60 is detachably attached to leading end portions of the outer shaft 71 and the inner shaft 72.

The inner plug 60 includes a cylindrical main body portion 60*a*, an attachment portion 60*b* that is provided in an upper portion of the main body portion 60*a* and connected to the leading end portion of the inner shaft 72, an annular, increasing-diameter elastic member 60*c* that is provided in an outer circumferential portion of the main body portion 60*a* and can be deformed so as to increase in diameter in a radially outward direction, a diameter-increasing mechanism (not shown) that deforms, and increases the diameter of, the increasing-diameter elastic member 60*c* in accordance with an operation for relatively rotating the inner shaft 72 of the inner plug insertion machine G, and a fixing mechanism (not shown) that positions and fixes the inner plug 60 in an inner circumferential surface-side peripheral edge portion of the hole 2 on the inner circumferential surface of the water pipe 1 in accordance with the operation for relatively rotating the inner shaft 72 of the inner plug insertion machine G. It should be noted that the main body portion 60*a* of the inner plug 60 is configured so as to have an outer diameter slightly smaller than the inner diameter of the hole 2.

Accordingly, in the sealing step, first, in a state in which the inner plug 60 is attached to the outer shaft 71 and the inner shaft 72 of the inner plug insertion machine G via the attachment portion 60*b*, the coupling flange portion 70A of the inner plug insertion machine G is coupled and fixed to the coupling flange portion 7B of the gate valve 7 by means of the bolts 12 and nuts 13. Then, an operation for opening the valve element 7C of the gate valve 7 is performed. After that, an operation for winding up and tightening the pair of chains 76 is performed using a Lever Block etc. (not shown) to slide the outer shaft 71 and the inner shaft 72 toward the internal flow passage 3 along the axis of the branch pipe portion B, thereby disposing the inner plug 60, which is attached to the leading end portions of the outer shaft 71 and the inner shaft 72, at a position corresponding to the hole 2 in the radial direction of the water pipe 1. After that, a relatively rotating operation is performed using the handle 74, which is mounted on the rear end portion of the inner shaft 72, and thus, the inner plug 60 is positioned and fixed in the inner circumferential surface-side peripheral edge portion of the hole 2 on the inner circumferential surface of the water pipe 1 by the fixing mechanism. Then, the relatively rotating operation of the handle 74 is further performed. Thus, the increasing-diameter elastic member 60*c* is deformed so as to increase in diameter in the radially outward direction by the diameter-increasing mechanism, and the increasing-diameter elastic member 60*c* is brought into pressure contact with the hole 2.

In this manner, the inner plug 60 can be fixed to the hole 2, and also the hole 2 can be blocked in a sealed state.

Subsequently, the connection between the attachment portion 60*b* of the inner plug 60 and the inner shaft 72 is released. Then, the outer shaft 71 and the inner shaft 72 are retracted into the case portion 70, the fastening and coupling with the bolts 12 and nuts 13 is released, and the inner plug insertion machine G is removed from the coupling flange portion 7B of the gate valve 7. After that, the fastening and coupling with the bolts 10 and nuts 11 is released, and the gate valve 7 that is engaged with the annular recessed groove 6*c* of the valve attachment port portion 6 is removed from the coupling flange portion 6*b* of the pipe portion 6*a* of the valve attachment port portion 6.

It should be noted that a configuration may also be adopted in which the gate valve 7 is removed at the same time as the inner plug insertion machine G is removed.

Furthermore, in the sealing step, as shown in FIG. 12, the lid 61 is coupled and fixed to the coupling flange portion 6*b* of the pipe portion 6*a* of the valve attachment port portion 6 in a sealed state using the bolts 12 and nuts 13.

The lid 61 includes a flat plate-shaped main body portion 61*a*, a tube portion 61*b* protruding from a lower surface of the main body portion 61*a* and having a circular shape, and a coupling flange portion 61*c* extending radially outward from an outer circumferential portion of the tube portion 61*b*.

Specifically, in a state in which the tube portion 61*b* is internally fitted into the annular recessed groove 6*c* of the valve attachment port portion 6 via a seal member (not shown), the coupling flange portion 61*c* and the coupling flange portion 6*b* of the valve attachment port portion 6 are coupled and fixed to each other using the bolts 12 and nuts 13.

Thus, the valve attachment port portion 6 can be sealed in a state in which the hole 2 is sealed with the inner plug 60 and, furthermore, in a state in which the inner plug 60 is enclosed.

Accordingly, in the sealing step, the gate valve 7 can be removed. Thus, the gate valve 7 can be used in other sites, so that the cost of execution of works can be reduced. Also, the piping configuration of the portion where the hole 2 is formed can be simplified.

Other Embodiments (A) In the foregoing embodiment, the step portion 22A, in which the inner diameter-side region 22*f* of the insertion guide tube 22 is formed extending beyond the outer diameter-side region 22*e* toward the leading end side, is provided in the leading end portion of the insertion guide tube 22, and the insertion guide tube 22, in the abutting position, is in a state in which at least a part of the outer diameter-side region 22*e* of the step portion 22A abuts against the outer surface-side peripheral edge portion 2*a*, and at least a part of the inner diameter-side region 22*f* is fitted into the hole 2. However, other configurations can also be adopted.

Figure 13:
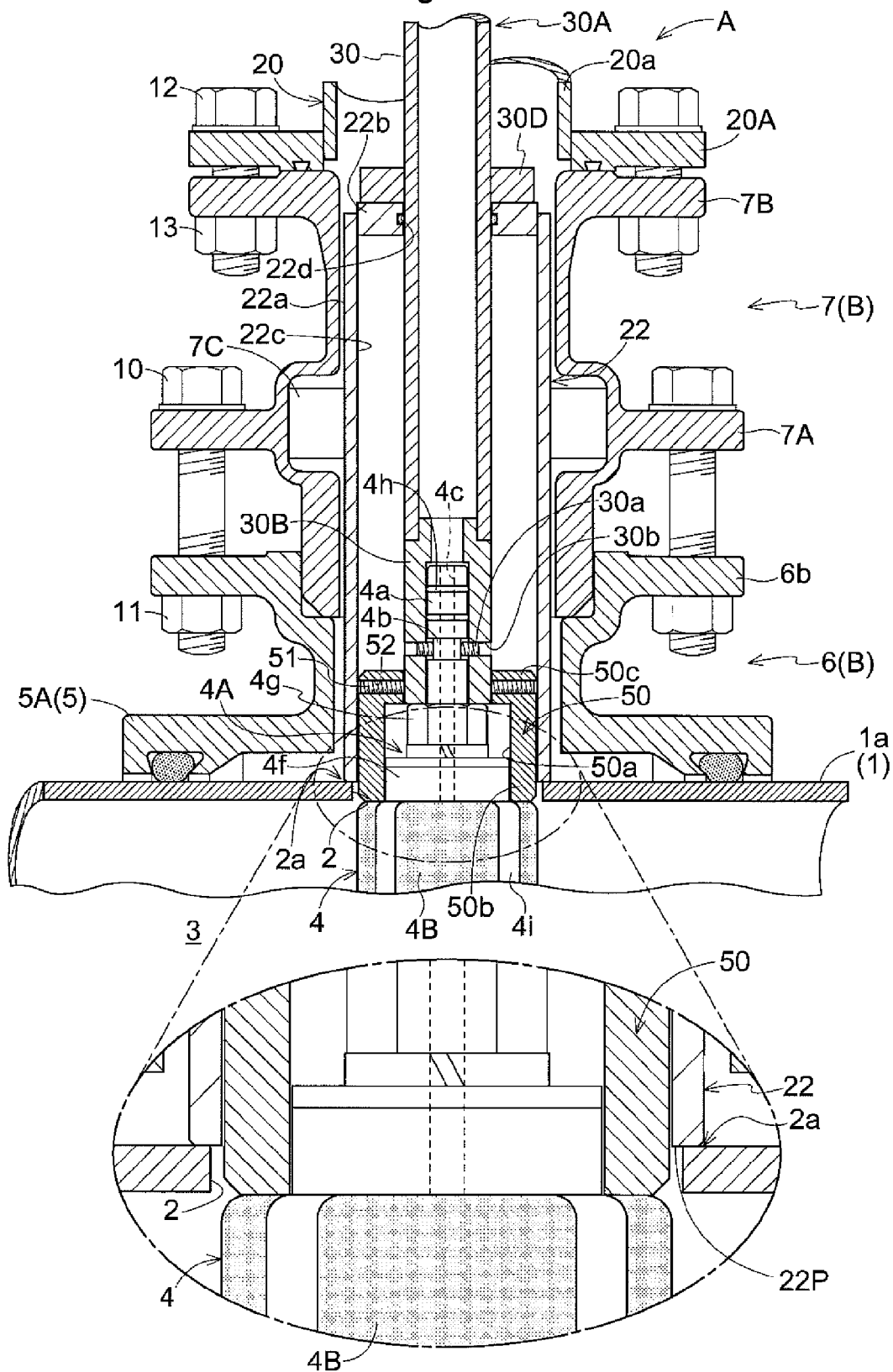
FIG. 13 is a longitudinal cross-sectional view showing the configuration of an insertion guide tube etc. according to another embodiment 1.

For example, as shown in FIG. 13, a configuration is possible in which the step portion 22A is omitted, and the inner diameter and the outer diameter of the tube wall portion 22a of the insertion guide tube 22 are fixed (thickness is fixed) in the direction along the axis Y of the branch pipe portion B. In addition, a configuration is also possible in which the outer diameter of this tube wall portion 22a is set to be larger than the inner diameter of the hole 2 and smaller than the inner diameter of the tubular portion 7a of the gate valve 7 and the inner diameter of the pipe portion 6a of the valve attachment port portion 6, the inner diameter of the tube wall portion 22a is set to be larger than the outer diameter of the axis adjustment tube member 50 and smaller than the inner diameter of the hole 2, and the insertion guide tube 22 is brought into an abutting position in which a leading end surface 22P of the insertion guide tube 22 abuts against the outer surface-side peripheral edge portion 2a of the hole 2 by moving the tubular shaft 30 together with the insertion guide tube 22 inside the sealing case 20 and inside the branch pipe portion B along the axis Y of the branch pipe portion B.

In this abutting position, the inner surface of the tube wall portion 22a of the insertion guide tube 22 is located inward (on the side of the axis Y of the branch pipe portion B) of the inner surface of the hole 2. Therefore, during insertion of the blockage bag 4 into the internal flow passage 3, the blockage bag 4 does not come into contact with the hole 2.

It should be noted that the inner diameter of the tube wall portion 22a of the insertion guide tube 22 may also be set to be equal to the inner diameter of the hole 2.

Figure 14:
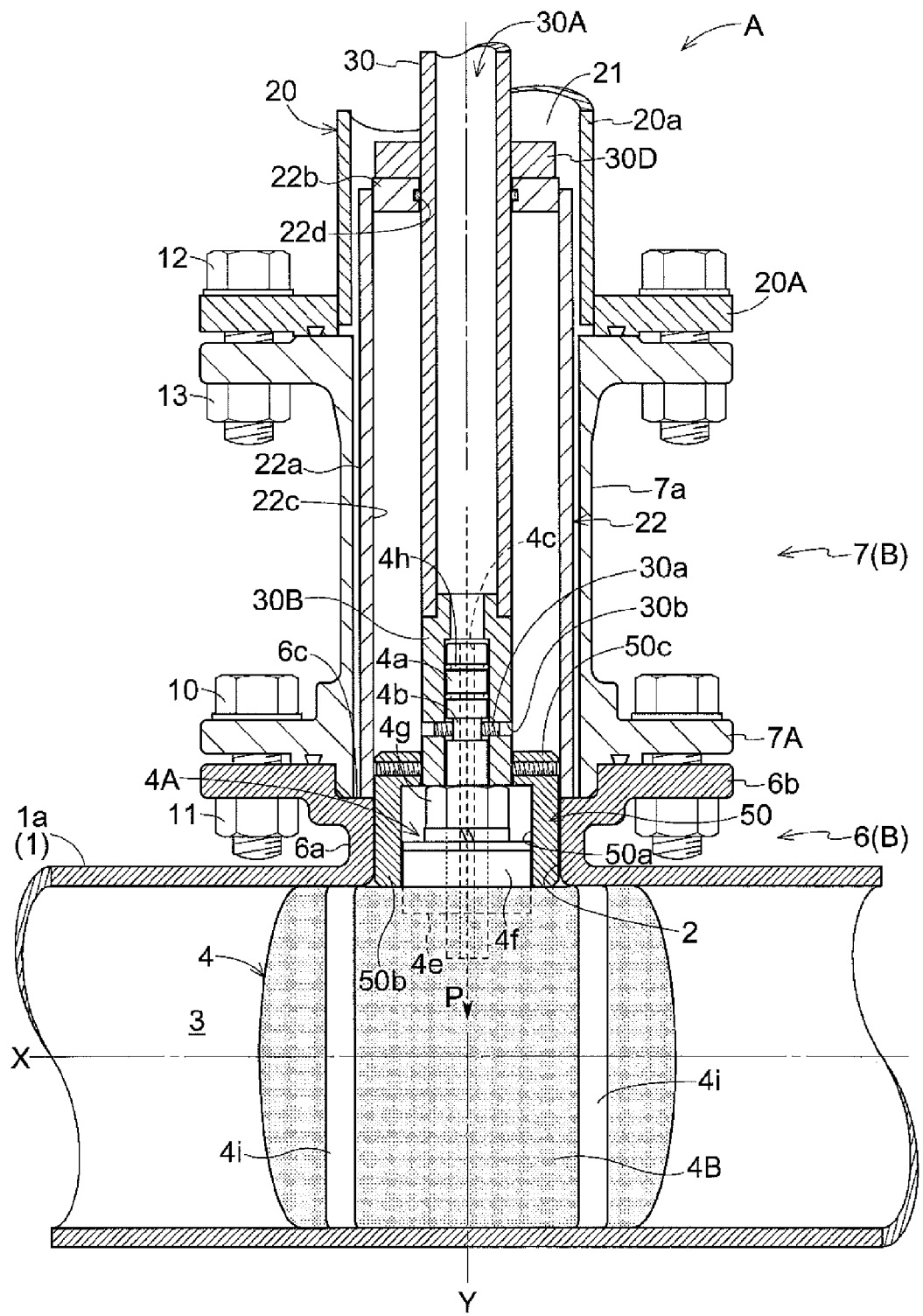
FIG. 14 is a longitudinal cross-sectional view showing the configuration of an insertion guide tube etc. according to another embodiment 2.

(B) In the foregoing embodiment, a configuration is adopted in which the hole (an example of the branch port) 2 is formed in the outer circumferential surface of the water pipe 1 using a hole forming device, and then the blockage bag 4 is inserted via this hole 2. However, a configuration is also possible in which the blockage bag 4 is inserted via the branch port 2 that is formed in the outer circumferential surface of the water pipe 1 in advance. For example, as shown in FIG. 14, a configuration may be adopted in which the valve attachment port portion (an example of the attachment port portion) 6 is integrally formed with the water pipe 1 in a state in which the valve attachment port portion 6 is in communication with the branch port 2 that is formed in the outer circumferential surface of the water pipe 1 in advance, and the blockage bag 4 is inserted via this branch port 2.

Specifically, with regard to the gate valve (an example of the valve member) 7, in a watertight state in which the upstream end portion of the tubular portion 7a of the gate valve 7 is engaged with the annular recessed groove 6c of the valve attachment port portion 6 via an O-ring (not shown), the upstream-side coupling flange portion 7A of the gate valve 7 is fastened and coupled to the coupling flange portion 6b of the pipe portion 6a using the bolts 10 and nuts 11. It should be noted that the valve attachment port portion 6 and the gate valve 7 function as the branch pipe portion B.

The tube wall portion 22a, of the insertion guide tube 22, that is configured so as to have fixed inner and outer diameters (fixed thickness) in the direction along the axis Y of the branch pipe portion B is formed such that the outer diameter is slightly smaller than the inner diameter of the tubular portion 7a of the gate valve 7 and the inner diameter is slightly larger than the outer diameter of the tube wall portion 50b of the axis adjustment tube portion 50. When the tubular shaft 30 is slid along the axis Y of the branch pipe portion B, the tubular shaft 30 moves together with the insertion guide tube 22 in a state in which the tubular shaft 30 moves relative to the sealing case 20 but does not move relative to the insertion guide tube 22, and the insertion guide tube 22 is brought into an abutting position in which at least a part of the leading end portion of the insertion guide tube 22 abuts against the annular recessed groove 6c of the valve attachment port portion 6. Here, a portion of the annular recessed groove 6c against which the leading end portion of the insertion guide tube 22 abuts is located radially inward, with respect to the radial direction, of a portion of the annular recessed groove 6c against which the upstream end portion of the tubular portion 7a of the gate valve 7 abuts, and functions as an abutted portion formed in the valve attachment port portion 6. That is to say, the annular recessed groove 6c is configured so as to have an enough width to be abutted against by and support the tubular portion 7a of the gate valve 7 and the leading end portion of the insertion guide tube 22, with respect to the radial direction of the pipe portion 6a of the valve attachment port portion 6. It should be noted that in the present embodiment, in the abutting position in which the leading end portion of the insertion guide tube 22 abuts against the annular recessed groove 6c, the inner surface 22c of the insertion guide tube 22 is disposed so as to have an diameter slightly smaller than the inner diameter of the pipe portion 6a of the valve attachment port portion 6, and the outer surface of the axis adjustment tube member 50 is disposed so as to be able to make sliding contact with the inner surface 22c of the insertion guide tube 22.

Moreover, when the tubular shaft 30 is slid further toward the internal flow passage 3 along the axis Y of the branch pipe portion B in the state in which the insertion guide tube 22 is in the abutting position, the blockage bag 4 is located at the intended internal flow passage blocking position in the internal flow passage 3, and the axis adjustment tube member 50 is located in the portion corresponding to the branch port 2 in the radial direction of the water pipe 1 (portion in which the axis adjustment tube member 50 abuts against the inner circumferential surface of the branch port 2 if the axis adjustment tube member 50 is moved in the direction of the pipe axis X of the water pipe 1). As a result, the leading end of the axis adjustment tube portion 50 and the inner end of the branch port 2 in the radial direction of the water pipe 1 are located at the same position in the radial direction of the water pipe 1.

It should be noted that in the present embodiment, the abutted portion formed in the valve attachment port portion 6 is configured as the portion where the leading end portion of the insertion guide tube 22 abuts against the annular recessed groove 6c of the valve attachment port portion 6; however, other configurations with respect to the abutted portion can be adopted as long as the abutted portion is formed in the valve attachment port portion 6 and abutted against by at least a part of the leading end portion of the insertion guide tube 22. For example, a configuration is also possible in which an upper surface of a protruding portion that is formed protruding radially inward from the inner surface of the pipe portion 6a of the valve attachment port portion 6 (for example, two protruding portions are provided at respective positions in the circumferential direction) is used as the abutted portion.

(C) In the foregoing embodiment, the water pipe 1 through which the service water Q, which is the fluid, flows is described as an example of the fluid pipe. However, the fluid may be a liquid or a gas, and the fluid pipe may be a pipe through which the liquid or the gas can flow.

(D) In the foregoing embodiment, the axis adjustment tube member 50 serving as the axis adjustment portion is fixed to the leading end portion 30B of the tubular shaft 30, the leading end portion 30B being located inside the insertion guide tube 22. However, the axis adjustment tube member 50 may also be fixed to a base end region (e.g., the attachment member 4f outside the bag of the mouthpiece member 4A) of the blockage bag 4, the base end region being located inside the insertion guide tube 22.

The axis adjustment portion is not limited to the axis adjustment tube member 50 having the bottomed tubular shape, and other configurations can be adopted as long as the axis adjustment portion is a member having a shape that enables sliding contact with the inner surface of the insertion guide tube 22.

(E) In the foregoing embodiment, the Lever Block is used as the push operation mechanism 40. However, other configurations can be adopted as long as an operation for pushing the tubular shaft 30 against the fluid pressure from the internal flow passage 3 can be performed.

(F) In the foregoing embodiment, the sealing case 20 includes the internal space 21 that has a length that allows the insertion guide tube 22 and the blockage bag 4 that is moved out of the insertion guide tube 22 to be housed in the internal space 21, so that when the upper surfaces of the respective insertion position restricting protrusions 30D of the tubular shaft 30 abut against the inner surface of the bottom wall portion 20b of the sealing case 20 in a state in which the lower surfaces of the respective insertion position restricting protrusions 30D abut against the outer surface of the bottom wall portion 22b of the insertion guide tube 22, the whole of the insertion guide tube 22 and the blockage bag 4 is entirely housed in the internal space 21 of the sealing case 20 in a state in which the leading end of the blockage bag 4 is located inside the internal space 21 of the sealing case 20 and at substantially the same position as the coupling flange portion 20A. However, the length of the sealing case 20 can be changed as appropriate.

For example, the sealing case 20 can be formed to have such a length that when the insertion guide tube 22 and the blockage bag 4 that is moved out of the insertion guide tube 22 are housed in the internal space 21 of the sealing case 20, the leading end (a part) of the blockage bag 4 protrudes from the internal space 21 of the sealing case 20 in a state in which the lower surfaces of the respective insertion position restricting protrusions 30D of the tubular shaft 30 abut against the outer surface of the bottom wall portion 22b of the insertion guide tube 22, and the upper surfaces of the respective insertion position restricting protrusions 30D abut against the inner surface of the bottom wall portion 20b of the sealing case 20. That is to say, the sealing case 20 can also be formed so as to not allow the blockage bag 4 to be entirely housed in the internal space 21.

Moreover, for example, the sealing case 20 can also be formed to have such a length that when the insertion guide tube 22 and the blockage bag 4 that is moved out of the insertion guide tube 22 are housed in the internal space 21 of the sealing case 20, when the lower surfaces of the respective insertion position restricting protrusions 30D of the tubular shaft 30 abut against the outer surface of the bottom wall portion 22b of the insertion guide tube 22, and the upper surfaces of the respective insertion position restricting protrusions 30D abut against the inner surface of the bottom wall portion 20b of the sealing case 20, the whole of the insertion guide tube 22 and the blockage bag 4 is entirely housed in the internal space 21 of the sealing case 20 in a state in which the leading end of the blockage bag 4 is located inside the internal space 21 of the sealing case 20 and at a position that is closer to the bottom wall portion 20b than the coupling flange portion 20A is.

What is claimed is:

1. A device for blocking a flow passage, comprising a blockage bag that is to be inserted into the fluid pipe via a branch port formed in the fluid pipe and that is to be deformed and expanded so as to increase in diameter to close an internal flow passage of the fluid pipe, the device comprising:
    a sealing case that is to be in communication with the branch port and that is to be detachably connected to a branch pipe portion having a valve member;
    an insertion guide tube that is inserted into the sealing case;
    a shaft that is inserted into the sealing case and the insertion guide tube so as to be slidable along an axis of the branch pipe portion while a sealed state is maintained and that includes a through flow passage inside;
    the blockage bag that is fixed to a leading end portion of the shaft, the leading end portion being located inside the insertion guide tube, and that is deformed and elastically expanded so as to increase in diameter by a diameter-increasing fluid that is supplied via the through flow passage;
    a push operation mechanism that pushes and moves the shaft against a fluid pressure inside the fluid pipe; and
    an axis adjustment portion that is fixed to the leading end portion of the shaft or a base end region of the blockage bag, the leading end portion and the base end region being located inside the insertion guide tube, and that makes sliding contact with an inner surface of the insertion guide tube,
    wherein the insertion guide tube, with the blockage bag in a reduced-size state being housed in the insertion guide tube, is moved inside the sealing case and inside the branch pipe portion along the axis of the branch pipe portion by the push operation mechanism, until the insertion guide tube is brought into an abutting position in which at least a part of the leading end portion of the insertion guide tube abuts against an outer surface-side peripheral edge portion of the branch port on an outer circumferential surface of the fluid pipe, and
    the blockage bag that is housed in the insertion guide tube in the abutting position is inserted into the internal flow passage of the fluid pipe from the inside of the insertion guide tube via the branch port along the axis of the branch pipe portion by the push operation mechanism, and in a state in which the blockage bag is located at a predetermined internal flow passage blocking position, the axis adjustment portion is located in a portion corresponding to the branch port in a radial direction of the fluid pipe.

2. The device for blocking the flow passage according to claim 1,
    wherein the leading end portion of the insertion guide tube includes a step portion in which an inner diameter-side region of the insertion guide tube is formed extending beyond an outer diameter-side region of the insertion guide tube toward a leading end side, and
    the insertion guide tube in the abutting position is positioned in a state in which at least a part of the outer diameter-side region abuts against the outer surface-side peripheral edge portion of the branch port, and at least a part of the inner diameter-side region is fitted into the branch port.

3. The device for blocking the flow passage according to claim 1,
wherein the axis adjustment portion is configured by an axis adjustment tube member that is formed to have an outer diameter substantially equal to an inner diameter of the insertion guide tube, and
a mouthpiece member including a fluid supply/discharge passage that is in communication with the through flow passage and having an outer surface that makes sliding contact with an inner surface of the axis adjustment tube member is provided in the base end region of the blockage bag, the mouthpiece member being disposed fitted into the axis adjustment tube member.

4. The device for blocking the flow passage according to claim 1,
wherein in a state in which the blockage bag is located at the internal flow passage blocking position, a leading end of the axis adjustment portion and an inner end of the branch port in the radial direction of the fluid pipe are located at the same position in the radial direction of the fluid pipe.

5. The device for blocking the flow passage according to claim 1,
wherein an insertion position restricting portion is formed on an outer circumferential surface of the shaft, protruding outward in the radial direction of the shaft, and in accordance with an operation for pushing the shaft by the push operation mechanism, the insertion position restricting portion abuts against an outer surface of a bottom portion of the insertion guide tube in the abutting position and restricts an insertion state of the blockage bag inserted into the fluid pipe to the internal flow passage blocking position.

6. The device for blocking the flow passage according to claim 1,
wherein the sealing case includes an internal space having a length that allows at least the insertion guide tube and the blockage bag that is moved out of the insertion guide tube to be housed in the internal space.

7. The device for blocking the flow passage according to claim 1,
wherein the blockage bag is configured such that the blockage bag is deformed and elastically expanded outward in a pipe axis direction and the radial direction, of the fluid pipe after being inserted to the internal flow passage blocking position in the internal flow passage of the fluid pipe along the axis of the branch pipe portion, and is configured such that the deformation and elastic expansion of the blockage bag allows the blockage bag to close the internal flow passage of the fluid pipe in a state in which the blockage bag blocks an inner surface-side peripheral edge portion of the branch port on an inner circumferential surface of the fluid pipe.

8. The device for blocking the flow passage according to claim 7,
wherein annular sealing portions are provided on an outer circumferential surface of the blockage bag, protruding from respective positions that are located on opposite sides of the shaft in the pipe axis direction, and when the blockage bag is deformed and elastically expanded, the annular sealing portions are brought into pressure contact with the inner circumferential surface of the fluid pipe over the entire circumference and frictionally hold the blockage bag.

9. A device for blocking a flow passage, comprising a blockage bag that is to be inserted into the fluid pipe via a branch port formed in the fluid pipe and that is to be deformed and expanded so as to increase in diameter to close an internal flow passage of the fluid pipe, the device comprising:
a sealing case that is to be detachably connected to a branch pipe portion having an attachment port portion that is integrally formed with the fluid pipe and a valve member that is attached to the attachment port portion, in a state in which the sealing case is in communication with the branch port;
an insertion guide tube that is inserted into the sealing case;
a shaft that is inserted into the sealing case and the insertion guide tube so as to be slidable along an axis of the branch pipe portion while a sealed state is maintained and that includes a through flow passage inside;
the blockage bag that is fixed to a leading end portion of the shaft, the leading end portion being located inside the insertion guide tube, and that is deformed and elastically expanded so as to increase in diameter by a diameter-increasing fluid that is supplied via the through flow passage;
a push operation mechanism that pushes and moves the shaft against a fluid pressure inside the fluid pipe; and
an axis adjustment portion that is fixed to the leading end portion of the shaft or a base end region of the blockage bag, the leading end portion and the base end region being located inside the insertion guide tube, and that makes sliding contact with an inner surface of the insertion guide tube,
wherein the insertion guide tube, with the blockage bag in a reduced-size state being housed in the insertion guide tube, is moved inside the sealing case and inside the branch pipe portion along the axis of the branch pipe portion by the push operation mechanism, until the insertion guide tube is brought into an abutting position in which at least a part of the leading end portion of the insertion guide tube abuts against an abutted portion that is formed in the attachment port portion, and
the blockage bag that is housed in the insertion guide tube in the abutting position is inserted into the internal flow passage of the fluid pipe from the inside of the insertion guide tube via the branch port along the axis of the branch pipe portion by the push operation mechanism, and in a state in which the blockage bag is located at a predetermined internal flow passage blocking position, the axis adjustment portion is located in a portion corresponding to the branch port in a radial direction of the fluid pipe.

10. The device for blocking the flow passage according to claim 9,
wherein the axis adjustment portion is configured by an axis adjustment tube member that is formed to have an outer diameter substantially equal to an inner diameter of the insertion guide tube, and
a mouthpiece member including a fluid supply/discharge passage that is in communication with the through flow passage and having an outer surface that makes sliding contact with an inner surface of the axis adjustment tube member is provided in the base end region of the blockage bag, the mouthpiece member being disposed fitted into the axis adjustment tube member.

11. The device for blocking the flow passage according to claim 9,
wherein in a state in which the blockage bag is located at the internal flow passage blocking position, a leading end of the axis adjustment portion and an inner end of the branch port in the radial direction of the fluid pipe are located at the same position in the radial direction of the fluid pipe.

12. The device for blocking the flow passage according to claim 9,
wherein an insertion position restricting portion is formed on an outer circumferential surface of the shaft, protruding outward in the radial direction of the shaft, and in accordance with an operation for pushing the shaft by the push operation mechanism, the insertion position restricting portion abuts against an outer surface of a bottom portion of the insertion guide tube in the abutting position and restricts an insertion state of the blockage bag inserted into the fluid pipe to the internal flow passage blocking position.

13. The device for blocking the flow passage according to claim 9,
wherein the sealing case includes an internal space having a length that allows at least the insertion guide tube and the blockage bag that is moved out of the insertion guide tube to be housed in the internal space.

14. The device for blocking the flow passage according to claim 9,
wherein the blockage bag is configured such that the blockage bag is deformed and elastically expanded outward in a pipe axis direction and the radial direction, of the fluid pipe after being inserted to the internal flow passage blocking position in the internal flow passage of the fluid pipe along the axis of the branch pipe portion, and is configured such that the deformation and elastic expansion of the blockage bag allows the blockage bag to close the internal flow passage of the fluid pipe in a state in which the blockage bag blocks an inner surface-side peripheral edge portion of the branch port on an inner circumferential surface of the fluid pipe.

15. The device for blocking the flow passage according to claim 14,
wherein annular sealing portions are provided on an outer circumferential surface of the blockage bag, protruding from respective positions that are located on opposite sides of the shaft in the pipe axis direction, and when the blockage bag is deformed and elastically expanded, the annular sealing portions are brought into pressure contact with the inner circumferential surface of the fluid pipe over the entire circumference and frictionally hold the blockage bag.

* * * * *